United States Patent
Dong et al.

(10) Patent No.: US 12,401,272 B2
(45) Date of Patent: *Aug. 26, 2025

(54) TOTEM POLE POWER FACTOR CORRECTION CIRCUIT

(71) Applicant: Delta Electronics (Shanghai) Co., Ltd., Shanghai (CN)

(72) Inventors: Kai Dong, Shanghai (CN); Yuesen Guo, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 179 days.

This patent is subject to a terminal disclaimer.

(21) Appl. No.: 18/211,362

(22) Filed: Jun. 19, 2023

(65) Prior Publication Data

US 2024/0006988 A1 Jan. 4, 2024

(30) Foreign Application Priority Data

Jun. 29, 2022 (CN) .......................... 202210761376.9
Aug. 5, 2022 (CN) .......................... 202210937223.5

(51) Int. Cl.
*H02M 1/42* (2007.01)
*H02M 1/00* (2006.01)
*H02M 7/219* (2006.01)

(52) U.S. Cl.
CPC ....... *H02M 1/4258* (2013.01); *H02M 1/0009* (2021.05); *H02M 7/219* (2013.01)

(58) Field of Classification Search
CPC .. H02M 1/4233; H02M 1/425; H02M 1/4258; H02M 1/4266; H02M 1/42; H02M 1/4208; H02M 1/4216; H02M 1/4225
See application file for complete search history.

(56) References Cited

U.S. PATENT DOCUMENTS

| 2011/0031941 A1* | 2/2011 | Green | H02M 1/4208 |
| | | | 323/205 |
| 2024/0014732 A1* | 1/2024 | Pohlmann | H02M 1/4233 |
| 2025/0015713 A1* | 1/2025 | Du | H02M 1/4233 |

FOREIGN PATENT DOCUMENTS

| CN | 104852567 A | 8/2015 |
| CN | 108663558 B | 6/2020 |
| CN | 113783414 A | 12/2021 |
| CN | 114825899 A | 7/2022 |
| WO | 2020232994 A1 | 11/2020 |
| WO | 2022032537 A1 | 2/2022 |

* cited by examiner

*Primary Examiner* — Nguyen Tran
(74) *Attorney, Agent, or Firm* — KIRTON McCONKIE; Evan R. Witt

(57) ABSTRACT

A totem pole power factor correction circuit includes a detection module and a control unit. The detection module includes a first detection resistor and a first detection circuit. After a voltage difference between the two terminals of the first detection resistor is detected by the first detection circuit, an output voltage is generated. The control unit determines the operating state of the totem pole power factor correction circuit according to the output voltage. If the totem pole power factor correction circuit is in the normal working state, and the totem pole power factor correction circuit is in a steady state or the output power (or the input voltage) is increased or decreased, the control unit controls the on/off states of the corresponding switches in the totem pole power factor correction circuit according to the output voltage.

19 Claims, 18 Drawing Sheets

TOTEM POLE POWER FACTOR CORRECTION CIRCUIT

CROSS-REFERENCE TO RELATED APPLICATION

This application claims priority to China Patent Application No. 202210761376.9, filed on Jun. 29, 2022, and also claims priority to China Patent Application No. 202210937223.5, filed on Aug. 5, 2022, the entire contents of which are incorporated herein by reference for all purposes.

FIELD OF THE INVENTION

The present disclosure relates to a totem pole power factor correction circuit, and more particularly to a totem pole power factor correction circuit with a detection module.

BACKGROUND OF THE INVENTION

Nowadays, switching power supply is developed toward high efficiency, high power density, high reliability and low cost. The power factor correction circuit is widely used in AC-DC power supply. Totem pole power factor correction circuit becomes more and more popular as its high efficiency. Wide bandgap devices including gallium nitride (GaN) power devices and silicon carbide (SiC) are quite suitable for totem pole power factor correction circuit as no reverse recovery charge comparing with the metal oxide semiconductor field effect transistor (MOSFET). Furthermore, the wide bandgap devices have the faster switching speed and the lower switching loss, which can increase the working frequency and the power density of the switching power supply, but still maintain good efficiency meantime.

A totem pole power factor correction circuit usually includes a detection resistor and at least one inductor. In the conventional totem pole power factor correction circuit, a detection circuit is used to detect the current flowing through the detection resistor in order to achieve the protection purpose for dealing with the abnormal condition, and the same number of additional detection circuits as the inductors are used to detect the currents flowing through the corresponding inductors in order to achieve the loop control purpose. That is, each inductor is detected by an individual single detection circuit. Consequently, the conventional totem pole power factor correction circuit needs to be equipped with at least two detection circuits. The first detection circuit is used to detect the current flowing through the detection resistor. At least one additional detection circuit is used to detect the current flowing through the at least one inductor, correspondingly. Due to this circuitry topology, the conventional totem pole power factor correction circuit have large volume and high installation cost.

Therefore, there is a need of providing an improved totem pole power factor correction circuit in order to overcome the drawbacks of the conventional technologies.

SUMMARY OF THE INVENTION

The present disclosure provides a totem pole power factor correction circuit. The control unit of the totem pole power factor correction circuit can determine whether the totem pole power factor correction circuit is in the normal working state or the abnormal state according to the output voltage from the first detection circuit. In case that the totem pole power factor correction circuit is in the abnormal state, a protecting mechanism can be rapidly enabled according to the output voltage from the first detection circuit. If the totem pole power factor correction circuit is in the normal working state, and the totem pole power factor correction circuit is in a steady state (for example, the output power and the input voltage remain unchanged) or the output power (or the input voltage) is changed (e.g., increased or decreased), the on/off states of the corresponding switches in the totem pole power factor correction circuit are controlled according to the output voltage from the first detection circuit. In other words, the control unit of the totem pole power factor correction circuit confirms the operating state of the totem pole power factor correction circuit, and when the totem pole power factor correction circuit is in the normal working state, the on/off states of the corresponding switches in the totem pole power factor correction circuit are controlled by using the single first detection circuit. In comparison with the conventional totem pole power factor correction circuit using at least two detection modules, the number of detection module used in the totem pole power factor correction circuit of the present disclosure is reduced. Consequently, the totem pole power factor correction circuit of the present disclosure has reduced volume and reduced cost.

In accordance with an aspect of present disclosure, a totem pole power factor correction circuit is provided. The totem pole power factor correction circuit is electrically coupled with an input power source. The totem pole power factor correction circuit includes a first bridge arm, a second bridge arm, a third bridge arm, a first inductor, a detection module and a control unit. The first bridge arm includes a first bypass diode and a second bypass diode connected in series. A connection point between the first bypass diode and the second bypass diode is a first node. The second bridge arm is connected with the first bridge arm in parallel. The second bridge arm includes a first switch and a second switch connected in series. A connection point between the first switch and the second switch is a second node. The third bridge arm is connected with the first bridge arm in parallel. The third bridge arm includes a third switch and a fourth switch connected in series. A connection point between the third switch and the fourth switch is a third node. The third node is electrically connected with a second terminal of the input power source. The first inductor is electrically connected between the first node and the second node. The detection module includes a first detection resistor and a first detection circuit. A first terminal of the first detection resistor, the first node and a first terminal of the first detection circuit are connected with each other. A second terminal of the first detection resistor, a first terminal of the input power source and a second terminal of the first detection circuit are connected with each other. A voltage difference between the first terminal and the second terminal of the first detection resistor is detected by the first detection circuit, and an output voltage is outputted from a third terminal of the first detection circuit. The control unit is electrically coupled with the third terminal of the first detection circuit. The control unit controls the first switch, the second switch, the third switch and the fourth switch. When the output voltage is greater than or equal to an upper limit voltage threshold or the output voltage is smaller than or equal to a lower limit voltage threshold, at least the third switch and the fourth switch are turned off under control of the control unit.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

Figure 1:
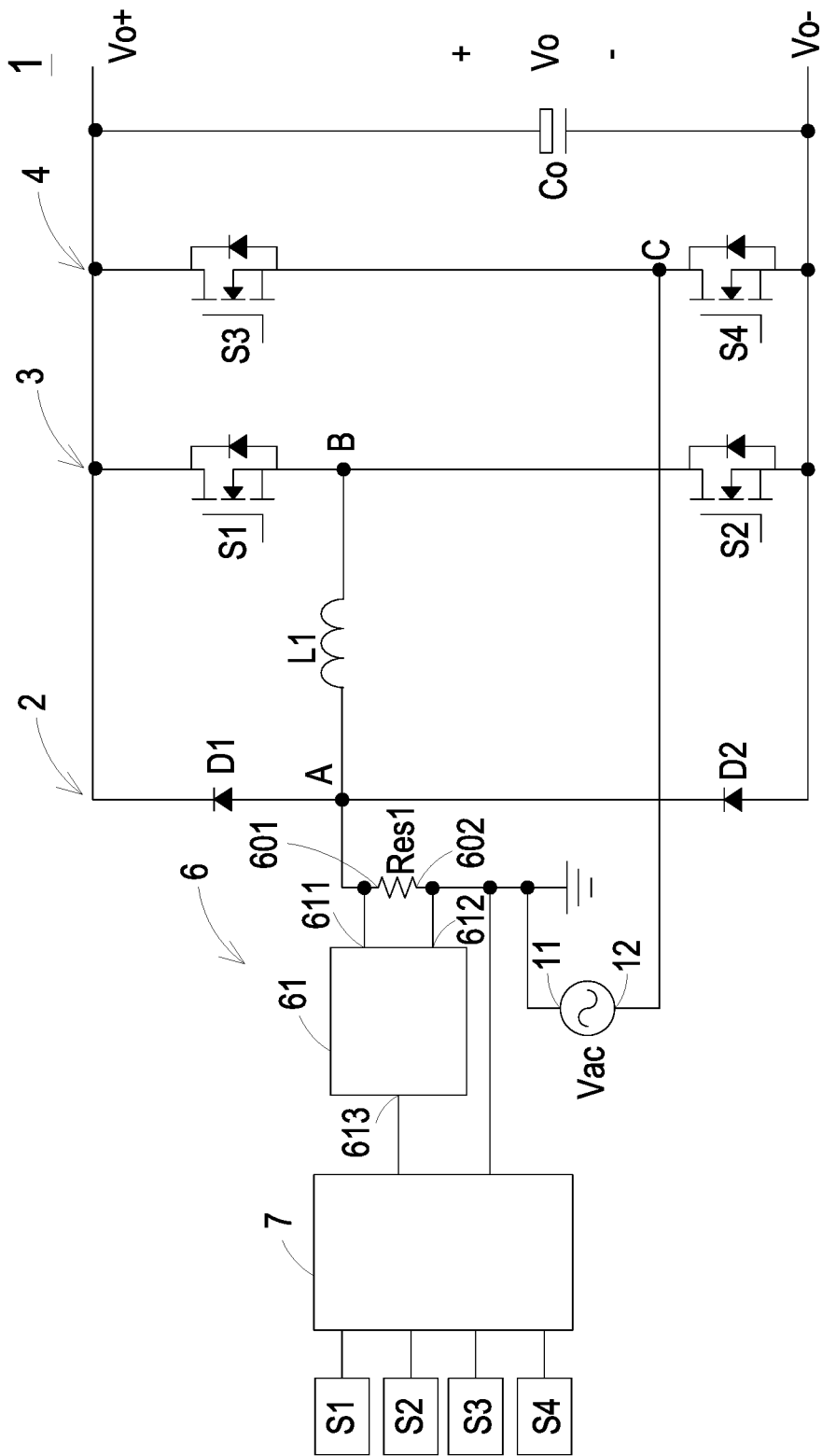
FIG. 1 is a schematic circuit diagram illustrating the circuitry topology of a totem pole power factor correction circuit according to a first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, when an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items.

FIG. 1 is a schematic circuit diagram illustrating the circuitry topology of a totem pole power factor correction circuit according to a first embodiment of the present disclosure. The totem pole power factor correction circuit 1 is electrically coupled with an input power source Vac. In addition, the totem pole power factor correction circuit 1 receives an input AC power from the input power source Vac. By the totem pole power factor correction circuit 1, the input AC power is converted into an DC power. The DC power is transmitted to a load (not shown).

The input power source Vac includes a first terminal 11 and a second terminal 12. The input power source Vac provides the input AC power. In the positive half-cycle of the input AC power, the voltage at the first terminal 11 of the input power source Vac is greater than the voltage at the second terminal 12 of the input power source Vac. Under this circumstance, the current flows out of the input power source Vac through the first terminal 11 and flows into the input power source Vac through the second terminal 12. In the negative half-cycle of the input AC power, the voltage at the first terminal 11 of the input power source Vac is lower than the voltage at the second terminal 12 of the input power source Vac. Under this circumstance, the current flows out of the input power source Vac through the second terminal 12 and flows into the input power source Vac through the first terminal 11.

As shown in FIG. 1, the totem pole power factor correction circuit 1 includes an output positive terminal Vo+, an output negative terminal Vo−, a first bridge arm 2, a second bridge arm 3, a third bridge arm 4, a detection module 6, a control unit 7 and a first inductor L1. The DC power is outputted from the totem pole power factor correction circuit 1 to the load through the output positive terminal Vo+ and the output negative terminal Vo−.

The first bridge arm 2 includes a first bypass diode D1 and a second bypass diode D2 connected in series. The cathode of the first bypass diode D1 is connected with the output positive terminal Vo+. The anode of the second bypass diode D2 is connected with the output negative terminal Vo−. The connection point between the anode of the first bypass diode D1 and the cathode of the second bypass diode D2 is a first node A. The first node A is also connected with the detection module 6.

The second bridge arm 3 is connected with the first bridge arm 2 in parallel. The second bridge arm 3 includes a first switch S1 and a second switch S2. The first switch S1 and the second switch S2 are connected in series between the output positive terminal Vo+ and the output negative terminal Vo−. The connection point between the first switch S1 and the second switch S2 is a second node B. The first switch S1 and the second switch S2 are electrically connected with the control unit 7. For succinctness, the connecting relationship between the switches S1 and S2 and the control unit 7 is not shown. The on/off states of the first switch S1 and the second switch S2 are controlled by the control unit 7. In some embodiments, the first switch S1 and the second switch S2 are SiC switches, GaN switches or MOSFET switches. In addition, the first inductor L1 is electrically connected between the first node A and the second node B.

The third bridge arm 4, the first bridge arm 2 and the second bridge arm 3 are connected in parallel. The third bridge arm 4 includes a third switch S3 and a fourth switch S4. The third switch S3 and the fourth switch S4 are connected in series between the output positive terminal Vo+ and the output negative terminal Vo−. The connection point between the third switch S3 and the fourth switch S4 is a third node C. The third node C is electrically connected with the second terminal 12 of the input power source Vac. The third switch S3 and the fourth switch S4 are electrically connected with the control unit 7. For succinctness, the connecting relationship between the switches S3 and S4 and the control unit 7 is not shown. The on/off states of the third switch S3 and the fourth switch S4 are controlled by the control unit 7. In some embodiments, the third switch S3 and the fourth switch S4 are SiC switches, GaN switches or MOSFET switches.

In an embodiment, the totem pole power factor correction circuit 1 further includes an output capacitor Co. The output capacitor Co is electrically connected between the output positive terminal Vo+ and the output negative terminal Vo−.

The detection module 6 includes a first detection resistor Res1 and a first detection circuit 61. The first detection resistor Res1 includes a first terminal 601 and a second terminal 602. The first terminal 601 of the first detection resistor Res1 is electrically connected with the first node A. The second terminal 602 of the first detection resistor Res1 is electrically connected with the first terminal 11 of the input power source Vac. In other words, the first detection resistor Res1 and the first inductor L1 are connected in series between the first terminal 11 of the input power source Vac and the second node B. The output current from the input power source Vac flows through the first detection resistor Res1 and the first inductor L1. The first detection circuit 61 includes a first terminal 611, a second terminal 612 and a third terminal 613. The first terminal 611 of the first detection circuit 61, the first terminal 601 of the first detection resistor Res1 and the first node A are connected with each other. The second terminal 612 of the first detection circuit 61, the second terminal 602 of the first detection resistor Res1 and the first terminal 11 of the input power source Vac are connected with each other. The third terminal 613 of the first detection circuit 61 is electrically coupled with the control unit 7. Moreover, an output terminal of the control unit 7 is a ground terminal.

The two terminals of the first detection resistor Res1 are connected with the first terminal 611 and the second terminal 612 of the first detection circuit 61, respectively. When the output current from the input power source Vac flows through the first detection resistor Res1, a voltage difference between the two terminals of the first detection resistor Res1 is detected by the first detection circuit 61, and an output voltage is outputted from the third terminal 613 of the first detection circuit 61. According to the output voltage from the first detection circuit 61, the control unit 7 determines whether the totem pole power factor correction circuit 1 is in a normal working state or an abnormal state. Consequently, the on/off states of the switches in the totem pole power factor correction circuit 1 are correspondingly controlled by the control unit 7.

As mentioned above, the first detection circuit 61 generates the output voltage according to the voltage difference between the two terminals of the first detection resistor Res1, and the output voltage is transmitted to the control unit 7 through the third terminal 613 of the first detection circuit 61. According to the output voltage, the on/off states of the corresponding switches in the totem pole power factor correction circuit 1 are controlled by the control unit 7.

In an embodiment, the control unit 7 determines whether the output voltage from the third terminal 613 of the first detection circuit 61 lies between an upper limit voltage threshold and a lower limit voltage threshold. According to the determining result, the control unit 7 controls the on/off states of the corresponding switches in the totem pole power factor correction circuit 1.

For example, if the output voltage from the first detection circuit 61 is greater than or equal to the upper limit voltage threshold or smaller than or equal to the lower limit voltage threshold, the control unit 7 determines that the totem pole power factor correction circuit 1 is in the abnormal state. In case that the totem pole power factor correction circuit 1 is in the abnormal state, at least the third switch S3 and the fourth switch S4 are turned off under control of the control unit 7. In an embodiment, when the control unit 7 determines that the output voltage from the first detection circuit 61 is greater than or equal to the upper limit voltage threshold or smaller than or equal to the lower limit voltage threshold, all of the first switch S1, the second switch S2, the third switch S3 and the fourth switch S4 are turned off under control of the control unit 7.

If the output voltage from the first detection circuit 61 is lower than the upper limit voltage threshold and greater than the lower limit voltage threshold, the control unit 7 determines that the totem pole power factor correction circuit 1 is in the normal working state. When the totem pole power factor correction circuit 1 is operated in the normal working state, the on/off states of the first switch S1, the second switch S2, the third switch S3 and the fourth switch S4 are controlled by the control unit 7 according to the output voltage from the first detection circuit 61. The method of controlling the on/off states of the first switch S1, the second switch S2, the third switch S3 and the fourth switch S4 will be described later.

Figure 2:
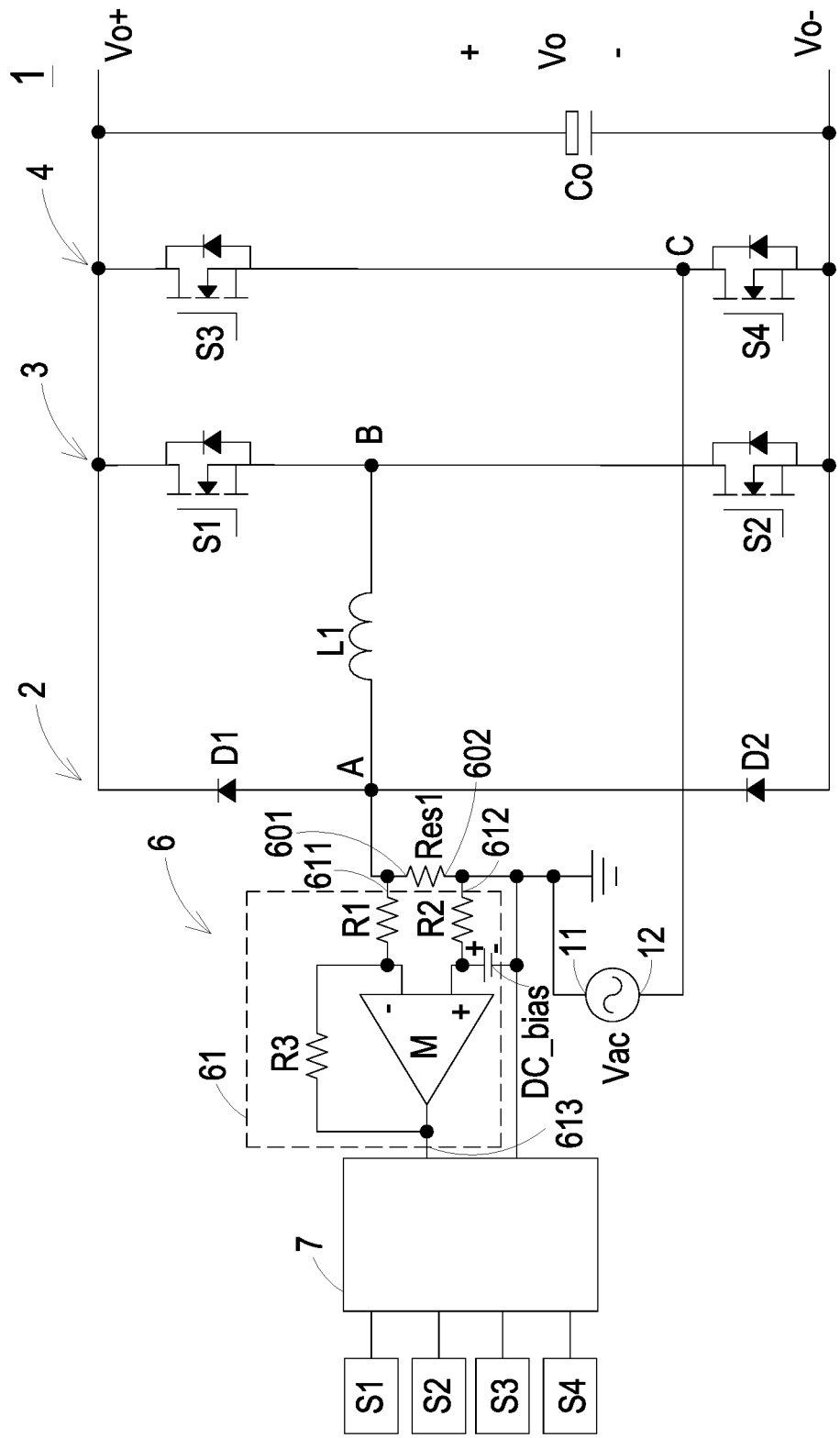
FIG. 2 is a schematic circuit diagram illustrating an exemplary circuitry topology of the first detection circuit in the totem pole power factor correction circuit as shown in FIG. 1.

In an embodiment, the first detection circuit 61 of the detection module 6 includes an amplifying circuit. FIG. 2 is a schematic circuit diagram illustrating an exemplary circuitry topology of the first detection circuit in the totem pole power factor correction circuit as shown in FIG. 1. As shown in FIG. 2, the first detection circuit 61 includes an amplifier M, a first resistor R1, a second resistor R2, a third resistor R3 and a DC power supply DC_bias. The output terminal of the amplifier M is electrically coupled with the third terminal 613 of the first detection circuit 61. The first resistor R1 is electrically connected between the negative input terminal of the amplifier M and the first terminal 611 of the first detection circuit 61. The second resistor R2 is electrically connected between the positive input terminal of the amplifier M and the second terminal 612 of the first detection circuit 61. The third resistor R3 is electrically connected between the negative input terminal of the amplifier M and the output terminal of the amplifier M. The positive terminal of the DC power supply DC_bias is electrically coupled with the positive input terminal of the amplifier M. The negative terminal of the DC power supply DC_bias is electrically connected with the second terminal 612 of the first detection circuit 61. In addition, the negative terminal of the DC power supply DC_bias is connected to the ground terminal. In some embodiments, the DC power supply DC_bias is a DC power supply, e.g., a linear voltage regulator circuit, a buck converter, a flyback converter or any other appropriate DC converter.

When the input AC power from the input power source Vac is in the positive half-cycle, the output current from the input power source Vac flows out of the first terminal 11, flows through the first detection resistor Res1, and flows to the first terminal 611 of the first detection circuit 61. When the output current flows through the first detection resistor Res1, there is a voltage drop at the two terminals of the detection resistor Res. The voltage difference between the two terminals of the first detection resistor Res1 is equal to IL1×Res1, wherein IL1 is the current flowing through the first detection resistor Res1, and Res1 is the resistance of the first detection resistor Res1. After the voltage difference between the two terminals of the first detection resistor Res1 is subjected to computation by the amplifier M, the amplifier M generates an output voltage to the control unit 7. That is, after the voltage difference between the two terminals of the first detection resistor Res1 is amplified and biased by the first detection circuit 61, the first detection circuit 61 generates the output voltage to the control unit 7. The output voltage outputted from the amplifier M may be expressed as the following formula:

$$Vo = VDC_{\_bias} * \left(1 + \frac{R3}{R1}\right) + IL1 * Res1 * \frac{R3}{R1}$$

In the above formula, VDC_bias is the DC bias voltage provided by the DC power supply DC_bias, R1 is the resistance of the first resistor, and R3 is the resistance of the third resistor.

When the input AC power from the input power source Vac is in the negative half-cycle, the output current from the input power source Vac flows out of the second terminal 12, flows through the first terminal 611 of the first detection circuit 61, the first detection resistor Res1 and the second terminal 612 of the first detection circuit 61 sequentially, and flows into the first terminal 11 of the input power source Vac. When the output current flows through the first detection resistor Res1, there is a voltage drop at the two terminals of the detection resistor Res. The voltage difference between the two terminals of the first detection resistor Res1 is equal to—IL1×Res1, wherein IL1 is the current flowing through the first detection resistor Res1, and Res1 is the resistance of the first detection resistor Res1. After the voltage difference between the two terminals of the first detection resistor Res1 is subjected to computation by the amplifier M, the amplifier M generates the output voltage to the control unit 7. That is, the voltage difference between the two terminals of the first detection resistor Res1 is amplified and biased, and the first detection circuit 61 generates the output voltage to the control unit 7. The output voltage outputted from the amplifier M may be expressed as the following formula:

$$Vo = VDC_{\_bias} * \left(1 + \frac{R3}{R1}\right) + IL1 * Res1 * \frac{R3}{R1}$$

In the above formula, VDC_bias is the DC bias voltage provided by the DC power supply $DC_{\_bias}$, R1 is the resistance of the first resistor, and R3 is the resistance of the third resistor.

As mentioned above, when the totem pole power factor correction circuit 1 is operated in the normal working state, the output voltage from the amplifier M is in a reasonable voltage range, i.e., $VDC_{\_bias} \times (1+R3/R1)$ plus/minus a fluctuation voltage. For example, the output voltage from the amplifier M (i.e. the first detection circuit 61) is lower than an upper limit voltage threshold and greater than a lower limit voltage threshold.

When the totem pole power factor correction circuit 1 is operated in the abnormal state (e.g., in a short-circuited condition), a lager inrush current $I_{inrush}$ flows through the first detection resistor Res1. Under this circumstance, the output voltage from the amplifier M is beyond the reasonable voltage range, i.e., $VDC_{\_bias} \times (1+R3/R1)$ plus/minus the fluctuation voltage. For example, the output voltage from the amplifier M (i.e. the first detection circuit 61) is greater than or equal to the upper limit voltage threshold and lower than or equal to the lower limit voltage threshold.

In an embodiment, the upper limit voltage threshold for example is $7/4 \times VDC_{\_bias} \times (1+R3/R1)$, and the lower limit voltage threshold for example is $1/4 \times VDC_{\_bias} \times (1+R3/R1)$. According to the result of comparing the output voltage from the first detection circuit 61 with the upper limit voltage threshold and the lower limit voltage threshold, the control unit 7 determines whether the totem pole power factor correction circuit 1 is in the normal working state or the abnormal state. Consequently, the on/off states of the switches in the totem pole power factor correction circuit 1 are correspondingly controlled by the control unit 7. For example, if the output voltage from the first detection circuit 61 is greater than or equal to the upper limit voltage threshold and lower than or equal to the lower limit voltage threshold, the control unit 7 determines that the totem pole power factor correction circuit 1 is in the abnormal state (e.g., in a short-circuited condition). When the totem pole power factor correction circuit 1 is operated in the abnormal state, at least the third switch S3 and the fourth switch S4 are turned off under control of the control unit 7. Consequently, the totem pole power factor correction circuit 1 can be protected. If the output voltage from the first detection circuit 61 is lower than the upper limit voltage threshold and greater than the lower limit voltage threshold, the control unit 7 determines that the totem pole power factor correction circuit 1 is operated in the normal working state.

Figure 3A:
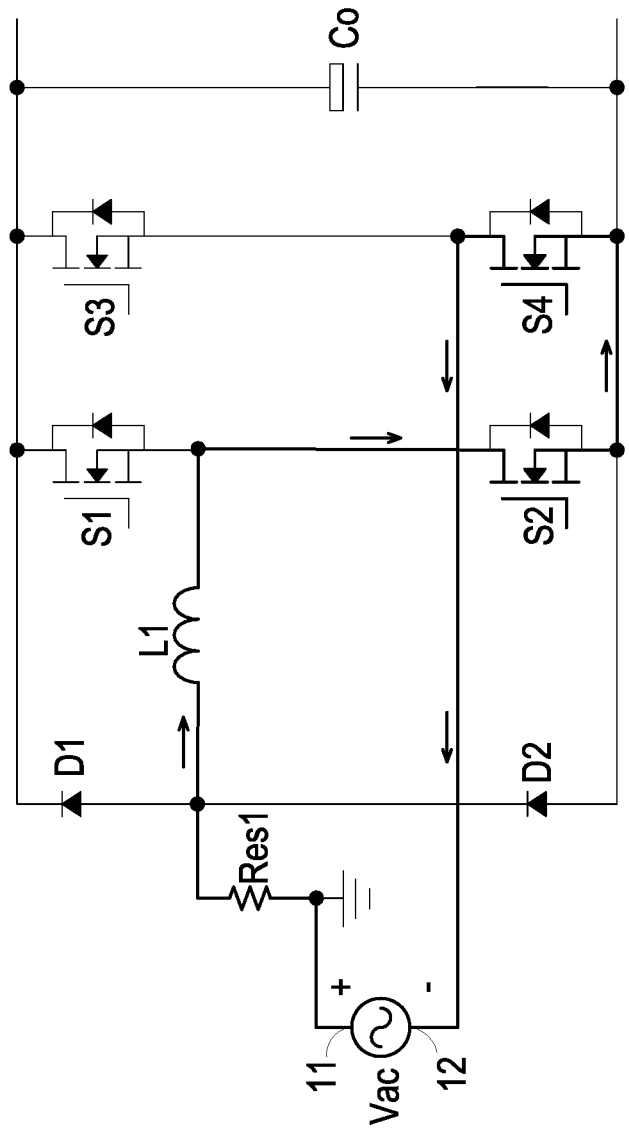
FIGS. 3A and 3B are schematic circuit diagrams illustrating the current direction when the totem pole power factor correction circuit as shown in FIG. 1 is operated in the normal working state and the input AC power from the input power source is in the positive half-cycle.
Figure 3B:
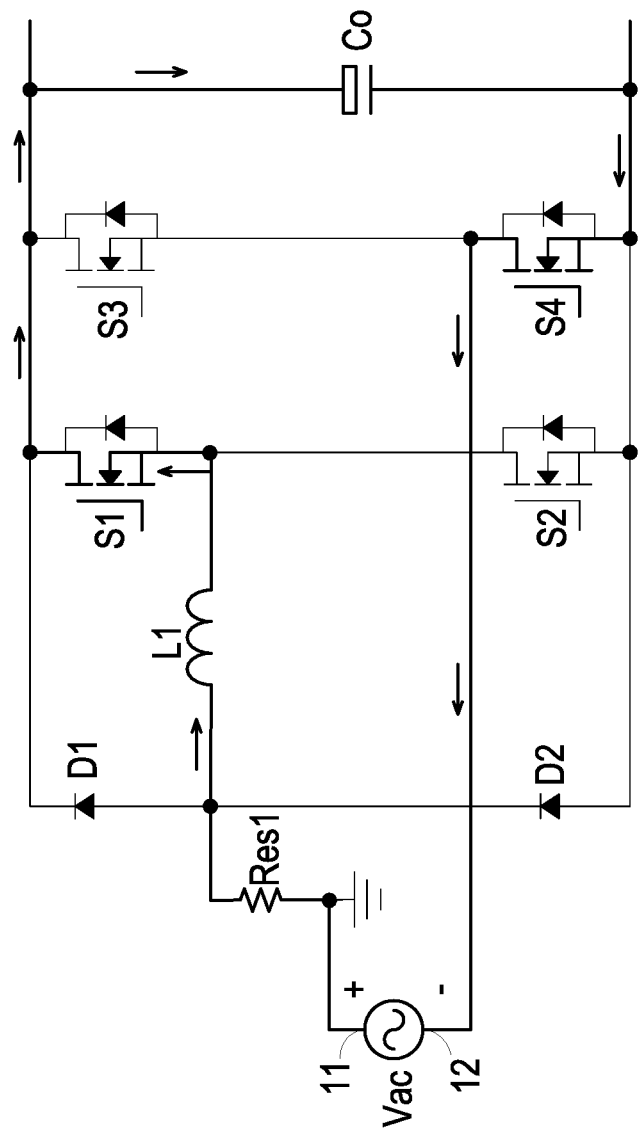
Figure 4A:
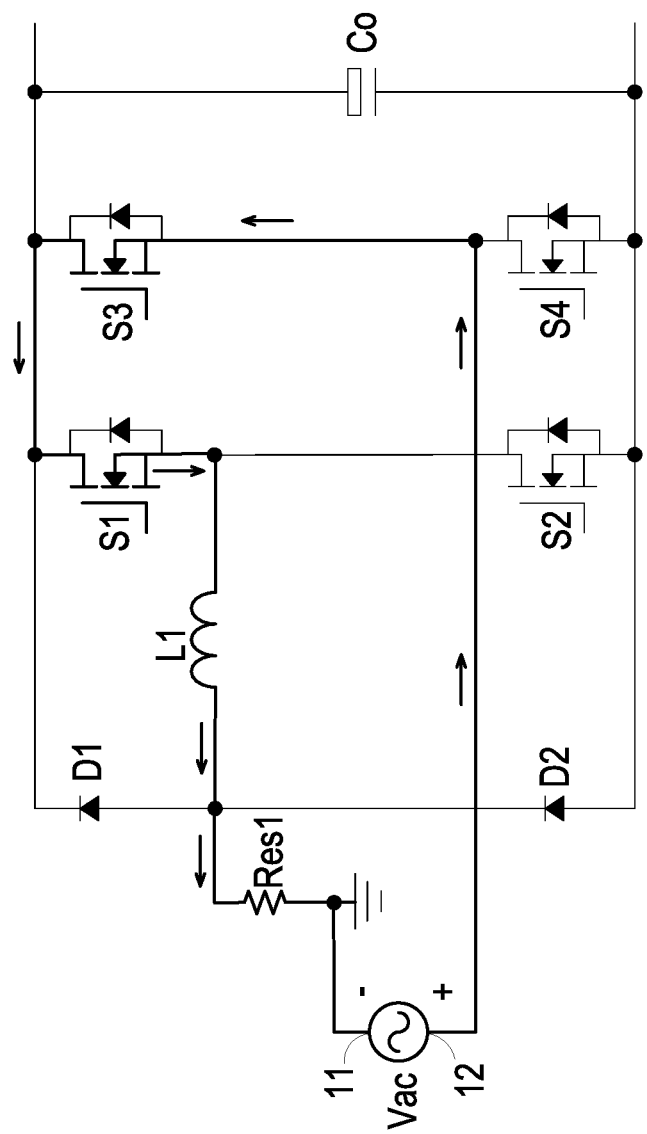
FIGS. 4A and 4B are schematic circuit diagrams illustrating the current direction when the totem pole power factor correction circuit as shown in FIG. 1 is operated in the normal working state and the input AC power from the input power source is in the negative half-cycle.
Figure 4B:
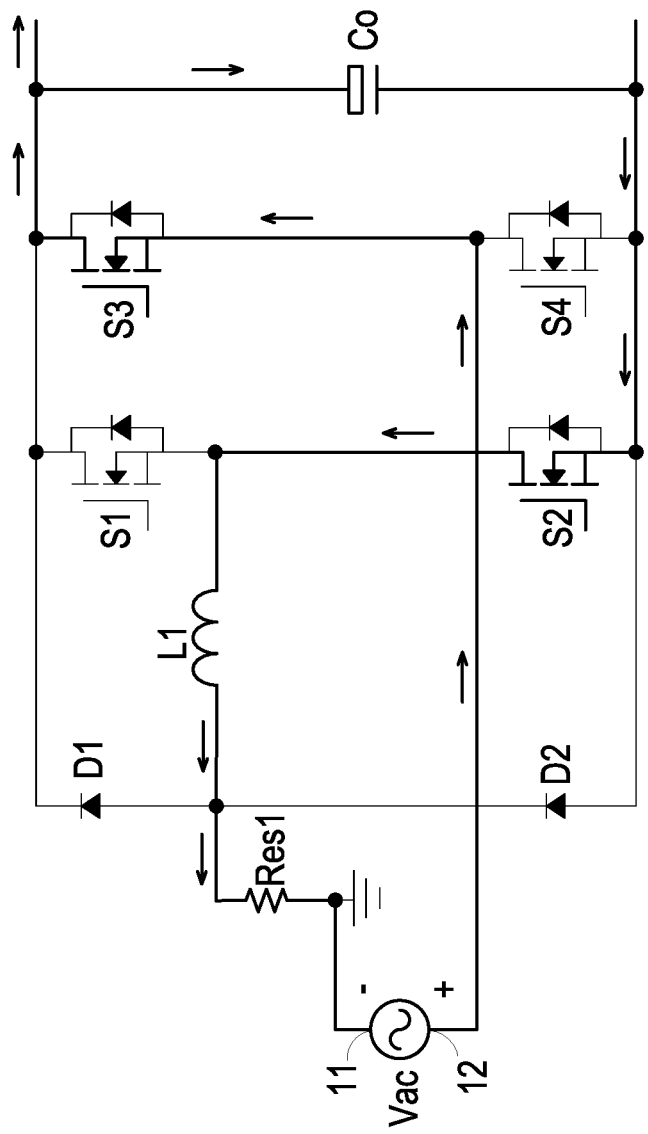

Hereinafter, the current direction of the totem pole power factor correction circuit 1 in the normal working state will be described with reference to FIGS. 3A, 3B, 4A and 4B. FIGS. 3A and 3B are schematic circuit diagrams illustrating the current direction when the totem pole power factor correction circuit as shown in FIG. 1 is operated in the normal working state and the input AC power is in the positive half-cycle. FIGS. 4A and 4B are schematic circuit diagrams illustrating the current direction when the totem pole power factor correction circuit as shown in FIG. 1 is operated in the normal working state and the input AC power is in the negative half-cycle. In order to well understand the current direction of the totem pole power factor correction circuit 1, the first detection circuit 61 of the detection module 6 and the control unit 7 are not shown in FIGS. 3A, 3B, 4A and 4B.

If the output voltage from the first detection circuit 61 (or the amplifier M as shown in FIG. 2) is lower than the upper limit voltage threshold and greater than the lower limit voltage threshold, the control unit 7 determines that the totem pole power factor correction circuit 1 is operated in the normal working state. When the totem pole power factor correction circuit 1 is operated in the normal working state, the input AC power is in the positive half-cycle and the first inductor L1 is in a charging mode, the current direction can be seen in FIG. 3A. According to the output voltage from the third terminal 613 of the first detection circuit 61, the second switch S2 and the fourth switch S4 are turned on and the first switch S1 and the third switch S3 are turned off under control of the control unit 7. After the output current from the input power source Vac flows out of the first terminal 11, the output current flows through the first detection resistor Res1, the first inductor L1, the second switch S2, the fourth switch S4 and the second terminal 12 of the input power source Vac sequentially. Consequently, the first inductor L1 is charged.

Then, the operating mode of the first inductor L1 is switched from the charging mode to a discharging mode. Please refer to FIG. 3B. According to the output voltage from the first detection circuit 61 (or the amplifier M as shown in FIG. 2), the first switch S1 and the fourth switch S4 are turned on and the second switch S2 and the third switch S3 are turned off under control of the control unit 7. After the output current from the input power source Vac flows out of the first terminal 11, the output current flows through the first detection resistor Res1, the first inductor L1, the first switch S1, the output capacitor Co (and/or the load), the fourth switch S4 and the second terminal 12 of the input power source Vac sequentially. Consequently, the output capacitor Co is charged and/or power is supplied to the load.

Similarly, if the output voltage from the first detection circuit 61 (or the amplifier M as shown in FIG. 2) is lower than the upper limit voltage threshold and greater than the lower limit voltage threshold, the control unit 7 determines that the totem pole power factor correction circuit 1 is operated in the normal working state. When the totem pole power factor correction circuit 1 is operated in the normal working state, the input AC power is in the negative half-cycle and the first inductor L1 is in a charging mode, the current direction can be seen in FIG. 4A. According to the output voltage from the first detection circuit 61 (or the amplifier M as shown in FIG. 2), the first switch S1 and the third switch S3 are turned on and the second switch S2 and the fourth switch S4 are turned off under control of the control unit 7. After the output current from the input power source Vac flows out of the second terminal 12, the output current flows through the third switch S3, the first switch S1, the first inductor L1, the first detection resistor Res1 and the first terminal 11 of the input power source Vac sequentially. Consequently, the first inductor L1 is charged.

Then, the operating mode of the first inductor L1 is switched from the charging mode to a discharging mode. Please refer to FIG. 4B. According to the output voltage from the third terminal 613 of the first detection circuit 61, the second switch S2 and the third switch S3 are turned on and the first switch S1 and the fourth switch S4 are turned off under control of the control unit 7. After the output current from the input power source Vac flows out of the second terminal 12, the output current flows through the third switch S3, the output capacitor Co (and/or the load), the second switch S2, the first inductor L1 and the first terminal 11 of the input power source Vac sequentially. Consequently, the output capacitor Co is charged and/or power is supplied to the load.

In an embodiment, the control unit determines whether the first inductor L1 is in the charging mode or the discharging mode according to the current flowing through the first inductor L1 (i.e., the current flowing through the first detection resistor Res1), which is detected by the first detection circuit 61. The output voltage from the first detection circuit 61 and the current flowing through the first inductor L1 are in a proportional relationship. According to the output voltage from the first detection circuit 61, the control unit 6 controls the on/off states of the switches in the totem pole power factor correction circuit 1.

As mentioned above, in the positive half-cycle of the input AC power, the output voltage outputted from the first detection circuit 61 may be expressed as the following formula: $V_o = VDC_{\_bias} \times (1 + R3/R1) + IL1 \times Res1 \times R3/R1$. The output voltage is acquired by the first detection circuit 61 according to the current flowing through the first detection resistor Res1 and the first detection resistor Res1, wherein IL1 is the current flowing through the first inductor L1 and the first detection resistor Res1.

In an embodiment, the totem pole power factor correction circuit 1 uses a dual-loop control mechanism. That is, the control unit includes a voltage outer loop and a current inner loop. As mentioned above, the output voltage from the first detection circuit 61 and the current flowing through the first inductor L1 are in a proportional relationship. Under control of the current inner loop, the current reference command from the voltage outer loop and the output voltage from the third terminal 613 of the first detection circuit 61 are processed into PWM signals. The on/off states of the switches in the totem pole power factor correction circuit 1 are controlled according to the PWM signals.

Consequently, according to the output voltage from the first detection circuit 61 (or the amplifier of FIG. 2), the control unit 7 can determine whether the totem pole power factor correction circuit 1 is in the normal working state or the abnormal state. If the control unit 7 determines that the totem pole power factor correction circuit 1 is in the normal working state, the control unit 7 controls the on/off states of the switches in the totem pole power factor correction circuit 1 in the charging mode or the discharging mode of the first inductor L1 according to the output voltage from the first detection circuit 61 (or the amplifier of FIG. 2).

In case that the output power of the totem pole power factor correction circuit 1 is increased or the input voltage is decreased, it takes a longer time period for the first inductor L1 to store energy. Then, the control unit 7 determines whether the stored energy in the first inductor L1 within a specified time period reaches a first set value according to the output voltage from the third terminal 613 of the first detection circuit 61, which is in a proportional relationship with the current flowing through the first inductor L1. Compared with the totem pole power factor correction circuit 1 in a steady state, when the output power of the totem pole power factor correction circuit 1 is increased or the input voltage is decreased and the input AC power is in the positive half-cycle, the control unit 7 extends the on duration of the second switch S2 according to the output voltage from the third terminal 613 of the first detection circuit 61. Consequently, the stored energy in the first inductor L1 reaches the first set value. Correspondingly, when the output power of the totem pole power factor correction circuit 1 is increased or the input voltage is decreased and the input AC power is in the negative half-cycle, the control unit 7 extends the on duration of the first switch S1 according to the output voltage from the third terminal 613 of the first detection circuit 61. Consequently, the stored energy in the first inductor L1 reaches the first set value. In this way, the totem pole power factor correction circuit 1 can meet the requirements of the load.

In case that the output power of the totem pole power factor correction circuit 1 is decreased or the input voltage is increased, it takes a shorter time period for the first inductor L1 to store energy. Then, the control unit 7 determines whether the stored energy in the first inductor L1 within a specified time period reaches a second set value according to the output voltage from the third terminal 613 of the first detection circuit 61, which is in a proportional relationship with the current flowing through the first inductor L1. Compared with the totem pole power factor correction circuit 1 in a steady state, when the output power of the totem pole power factor correction circuit 1 is decreased or the input voltage is increased and the input AC power is in the positive half-cycle of, the control unit 7 shorten the on duration of the second switch S2 according to the output voltage from the third terminal 613 of the first detection circuit 61. Consequently, the stored energy in the first inductor L1 reaches the second set value. Correspondingly, when the output power of the totem pole power factor correction circuit 1 is decreased or the input voltage is increased and the input AC power is in the negative half-cycle, the control unit 7 shortens the on duration of the first switch S1 according to the output voltage from the third terminal 613 of the first detection circuit 61. Consequently, the stored energy in the first inductor L1 reaches the second set value. In this way, the totem pole power factor correction circuit 1 can meet the requirements of the load.

In other words, if the totem pole power factor correction circuit 1 is in the normal working state, and the totem pole power factor correction circuit 1 is in the steady state or the output power (or the input voltage) is changed (e.g., increased or decreased), the control unit 7 can control the on/off states of the corresponding switches in the totem pole power factor correction circuit 1 according to the output voltage from the third terminal 613 of the first detection circuit 61.

As mentioned above, the control unit 7 can determine whether the totem pole power factor correction circuit 1 is in the normal working state or the abnormal state according to the output voltage from the third terminal 613 of the first detection circuit 61. If the control unit 7 determines that the totem pole power factor correction circuit 1 is in the abnormal state, a protecting mechanism is rapidly enabled according to the output voltage from the third terminal 613 of the first detection circuit 61.

If the totem pole power factor correction circuit 1 is in the normal working state, and the totem pole power factor correction circuit 1 is in the steady state or the output power (or the input voltage) is changed (e.g., increased or decreased), the control unit 7 controls the on/off states of the corresponding switches in the totem pole power factor correction circuit 1 according to the output voltage from the third terminal 613 of the first detection circuit 61. In other words, the control unit 7 confirms the operating state of the totem pole power factor correction circuit 1 and when the totem pole power factor correction circuit 1 is in the normal working state, the on/off states of the corresponding switches in the totem pole power factor correction circuit 1 are controlled by using the single first detection circuit 61. In comparison with the conventional totem pole power factor correction circuit using at least two detection modules, the number of detection module used in the totem pole power factor correction circuit 1 of the present disclosure is reduced. Consequently, the totem pole power factor correction circuit of the present disclosure has reduced volume and reduced cost.

In the above embodiment, the detection module 6 in the totem pole power factor correction circuit 1 includes the first detection resistor Res1 and the first detection circuit 61. If the control unit 7 determines that the output voltage from the first detection circuit 61 is greater than or equal to the upper limit voltage threshold or lower than or equal to the lower limit voltage threshold, at least the third switch S3 and the fourth switch S4 are turned off under control of the control unit 7. In other words, the control unit 7 determines whether the totem pole power factor correction circuit 1 is in the normal working state according to the result of comparing the output voltage with the upper limit voltage threshold and the lower limit voltage threshold. If the output voltage from the first detection circuit 61 is greater than or equal to the upper limit voltage threshold or lower than or equal to the lower limit voltage threshold, the control unit 7 determines that the totem pole power factor correction circuit 1 is in the abnormal state (e.g., in a short-circuited condition). When the totem pole power factor correction circuit 1 is operated in the abnormal state, at least the third switch S3 and the fourth switch S4 are turned off under control of the control unit 7. Consequently, the totem pole power factor correction circuit 1 can be protected.

Figure 3C:
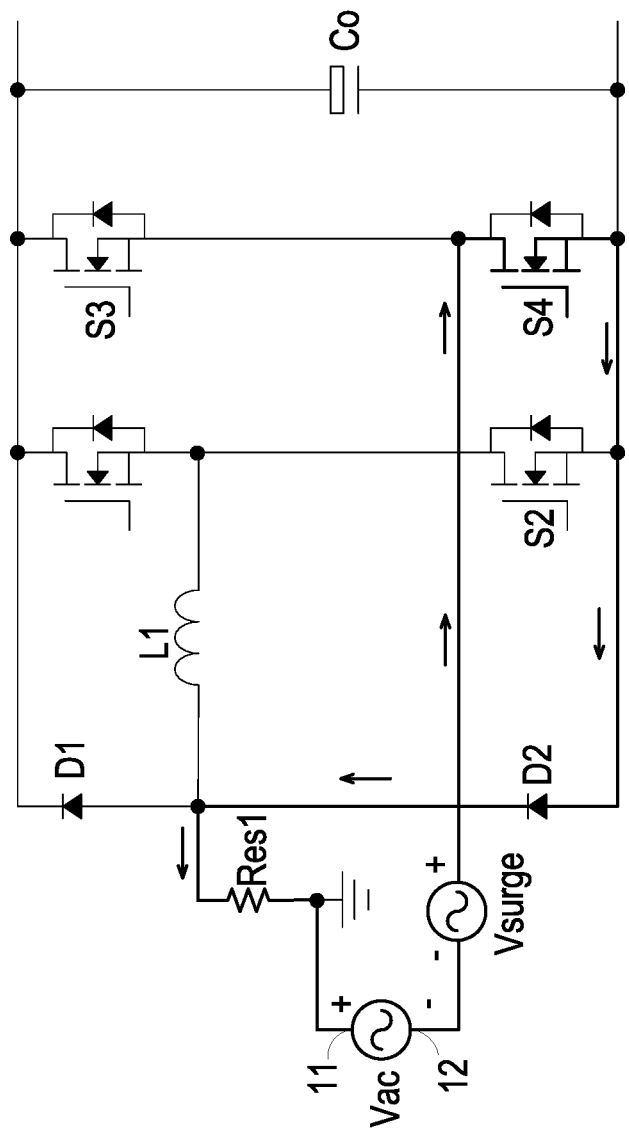
FIGS. 3C and 3D are schematic circuit diagrams illustrating the current direction when the totem pole power factor correction circuit as shown in FIG. 1 is operated in the abnormal state and the input AC power from the input power source is in the positive half-cycle.
Figure 3D:
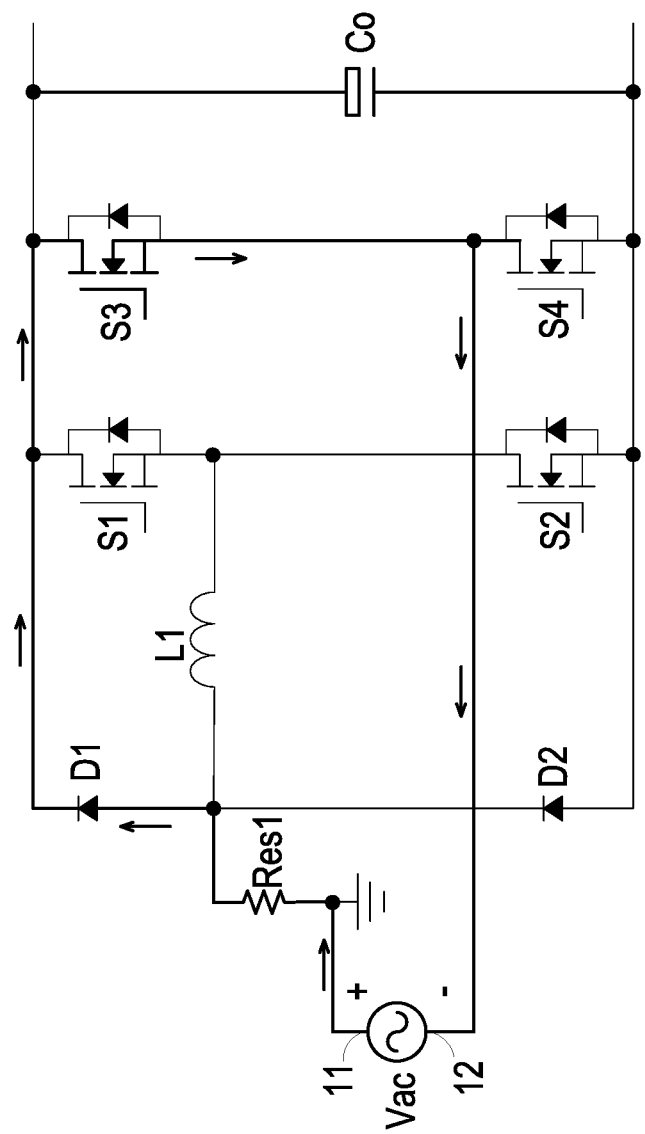
Figure 4C:
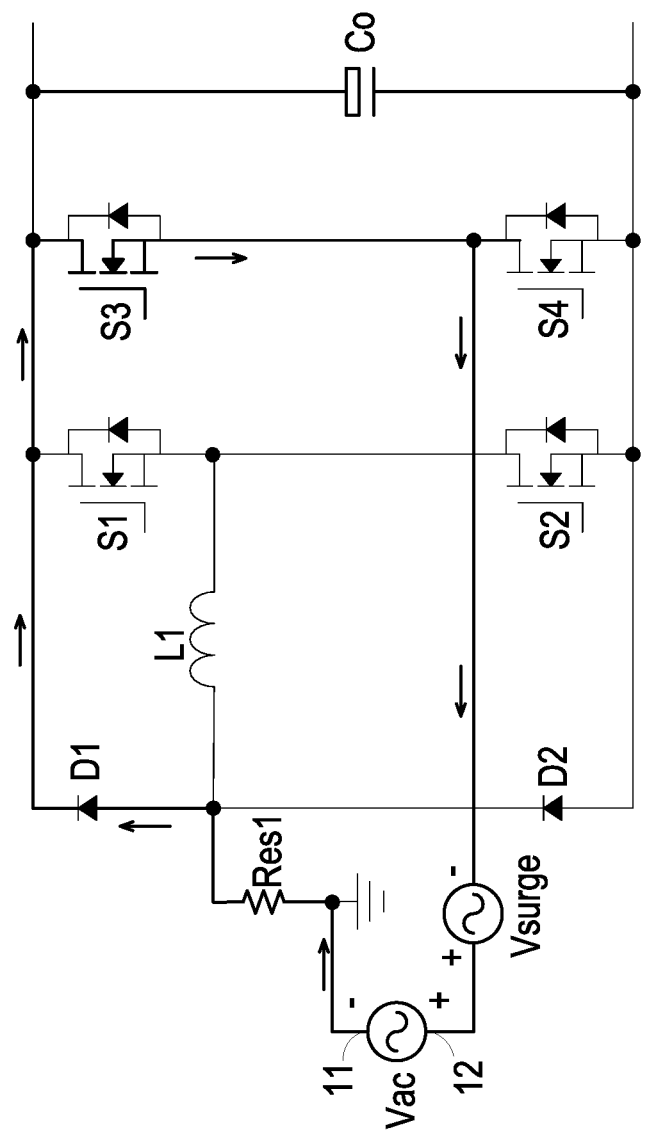
FIGS. 4C and 4D are schematic circuit diagrams illustrating the current direction when the totem pole power factor correction circuit as shown in FIG. 1 is operated in the abnormal state and the input AC power from the input power source is in the negative half-cycle.
Figure 4D:
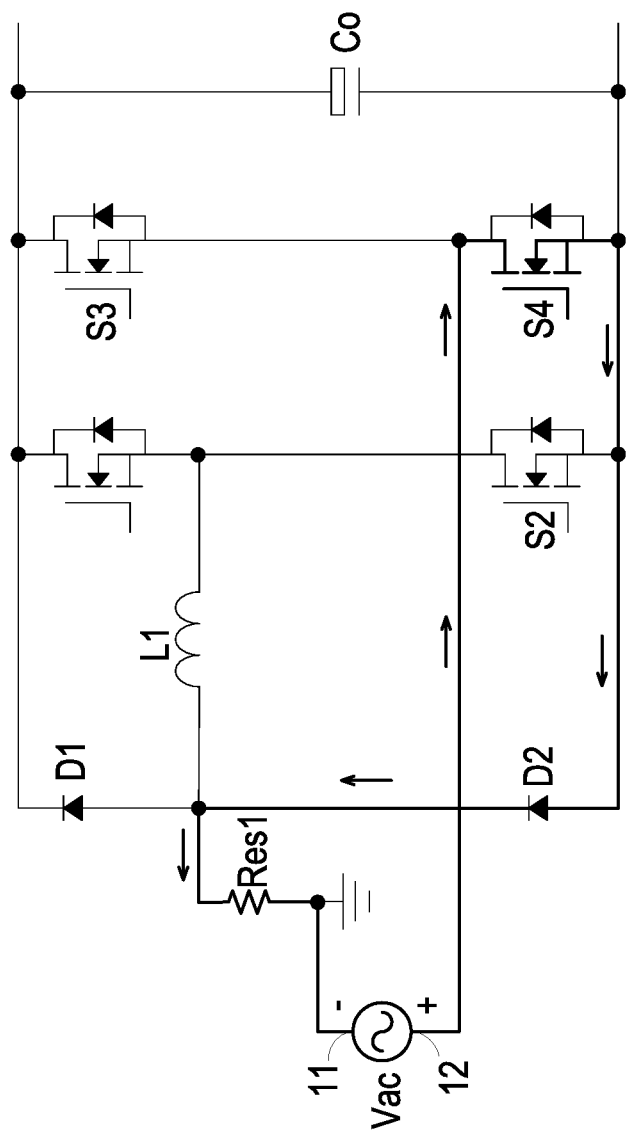

In case that an inrush voltage (e.g., a voltage generated by thunder) is superimposed on the input AC power, the polarity of the power supply is suddenly reversed. And the inconsistent control occurs because of time delay. For example, when the polarity of the power supply is suddenly reversed, the current direction of the totem pole power factor correction circuit 1 shown in FIGS. 3A and 3B which is in the normal working state is changed to the current direction as shown in FIG. 3C, and the current direction of the totem pole power factor correction circuit 1 shown in FIGS. 4A and 4B which is in the normal working state is changed to the current direction as shown in FIG. 4C. Consequently, the input power source is possibly in the short-circuited condition. Or the switch is erroneously triggered, the input power source is possibly in the short-circuited condition. For example, the on-state fourth switch S4 of the totem pole power factor correction circuit 1 in the normal working state and shown in FIG. 3A is erroneously turned off, but the off-state third switch S3 is erroneously turned on and the current direction is changed to the situation of FIG. 3D. For example, the on-state third switch S3 of the totem pole power factor correction circuit 1 in the normal working state and shown in FIG. 4A is erroneously turned off, but the off-state fourth switch S4 is erroneously turned on and the current direction is changed to the situation of FIG. 4D. If the switch is erroneously triggered, the input power source is possibly in the short-circuited condition. Under these circumstances, by detecting the voltage difference between the two terminals of the first detection resistor Res1, the first detection circuit 61 can generate the output voltage and if the output voltage is greater than or equal to the upper limit voltage threshold or lower than or equal to the lower limit voltage threshold, the corresponding switches are rapidly turned off under control of the control unit 7. In other words, the protecting measure can be taken immediately. Consequently, the possibility of causing damage of the totem pole power factor correction circuit 1 will be minimized.

Figure 5:
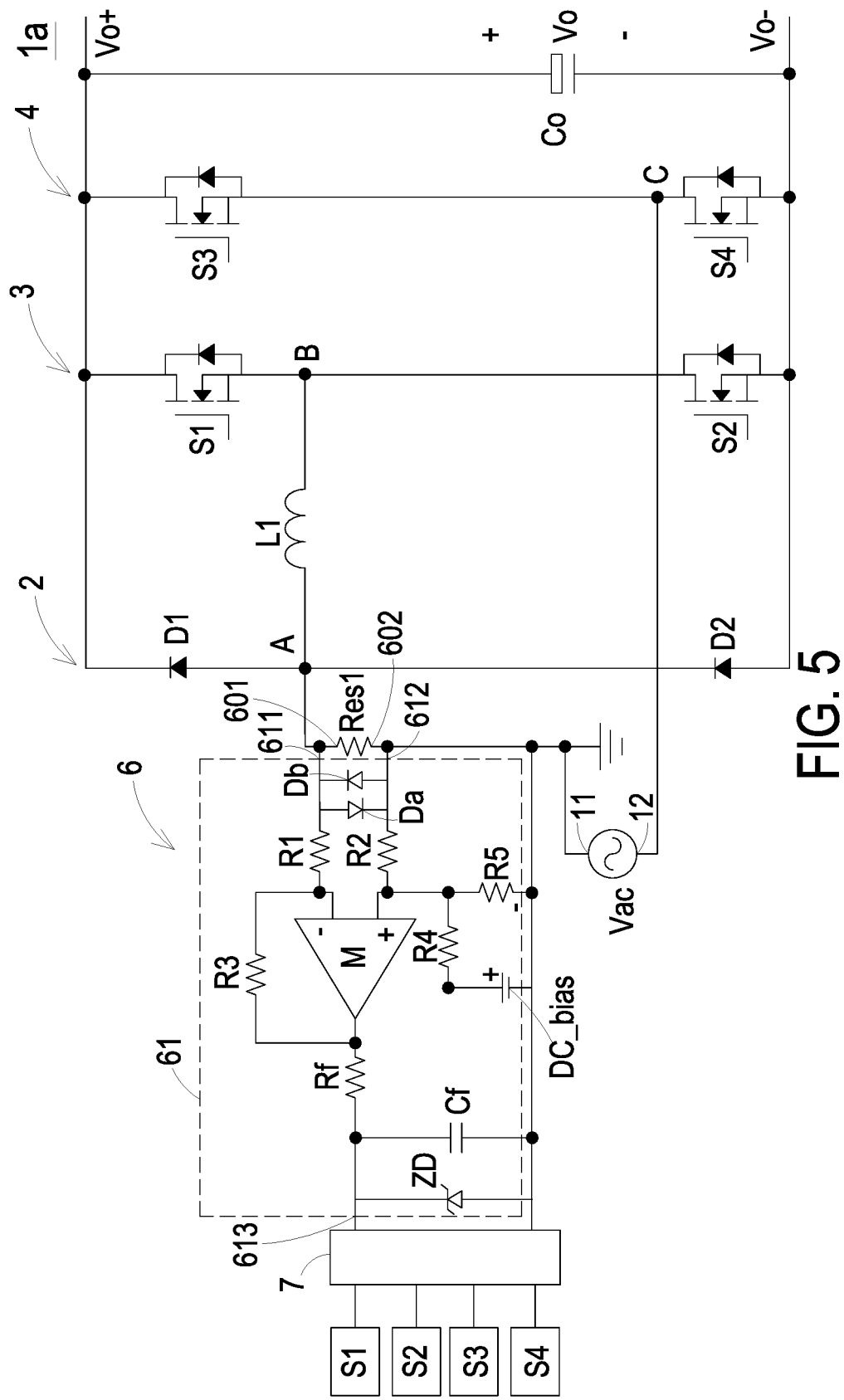
FIG. 5 is a schematic circuit diagram illustrating the circuitry topology of a totem pole power factor correction circuit according to a second embodiment of the present disclosure.

Generally, in order to avoid interference with the output voltage from the first detection circuit 61, which may lead to misjudgment by the control unit 7, in some embodiments, the first detection circuit 61 further includes a filtering resistor and a filtering capacitor. FIG. 5 is a schematic circuit diagram illustrating the circuitry topology of a totem pole power factor correction circuit according to a second embodiment of the present disclosure. In comparison with the totem pole power factor correction circuit of FIG. 2, the first detection circuit 61 in the totem pole power factor correction circuit 1*a* of this embodiment further includes a filtering resistor Rf, a filtering capacitor Cf and a Zener diode ZD.

The filtering resistor Rf is electrically connected between the output terminal of the amplifier M and the third terminal 613 of the first detection circuit 61. The filtering capacitor Cf is electrically connected with the filtering resistor Rf and the second terminal 612 of the first detection circuit 61. The filtering resistor Rf and the filtering capacitor Cf cooperate with each other to filter the output voltage. The anode of the Zener diode ZD is electrically connected with the second terminal 612 of the first detection circuit 61. The cathode of the Zener diode ZD is electrically connected with the third terminal 613 of the first detection circuit 61. The output voltage to be transmitted from the first detection circuit 61 to the control unit 7 can be clamped and protected by the Zener diode ZD.

In order to increase the flexibility of the DC power supply DC_bias, the bias voltage required by the amplifier M can be obtained through voltage division. As shown in FIG. 5, the first detection circuit 61 in the totem pole power factor correction circuit 1*a* of this embodiment further includes a first divider resistor R4 and a second divider resistor R5. The first divider resistor R4 is electrically connected between the positive input terminal of the amplifier M and the positive terminal of the DC power supply DC_bias. The second divider resistor R5 is electrically connected between the positive input terminal of the amplifier M and the second terminal 612 of the first detection circuit 61. In an embodiment, the DC power supply DC_bias not only provides a positive bias voltage to the amplifier M, but also supplies power to the control unit 7.

In order to prevent the voltage of the first detection resistor Res1 from being too high, the totem pole power factor correction circuit 1*a* is additionally equipped with positive and negative clamping diodes to clamp the voltage of the first detection resistor Res1. As shown in FIG. 5, the first detection circuit 61 of the totem pole power factor correction circuit 1*a* further includes a first clamping diode Da and a second clamping diode Db. The first clamping diode Da is connected with the first detection resistor Res1 in parallel. The anode of the first clamping diode Da is connected with the first terminal 611 of the first detection circuit 61. The cathode of the first clamping diode Da is connected with the second terminal 612 of the first detection circuit 61. The second clamping diode Db is connected with the first detection resistor Res1 in parallel. The anode of the second clamping diode Db is connected with the second terminal 612 of the first detection circuit 61. The cathode of the second clamping diode Db is connected with the first terminal 611 of the first detection circuit 61.

Figure 6:
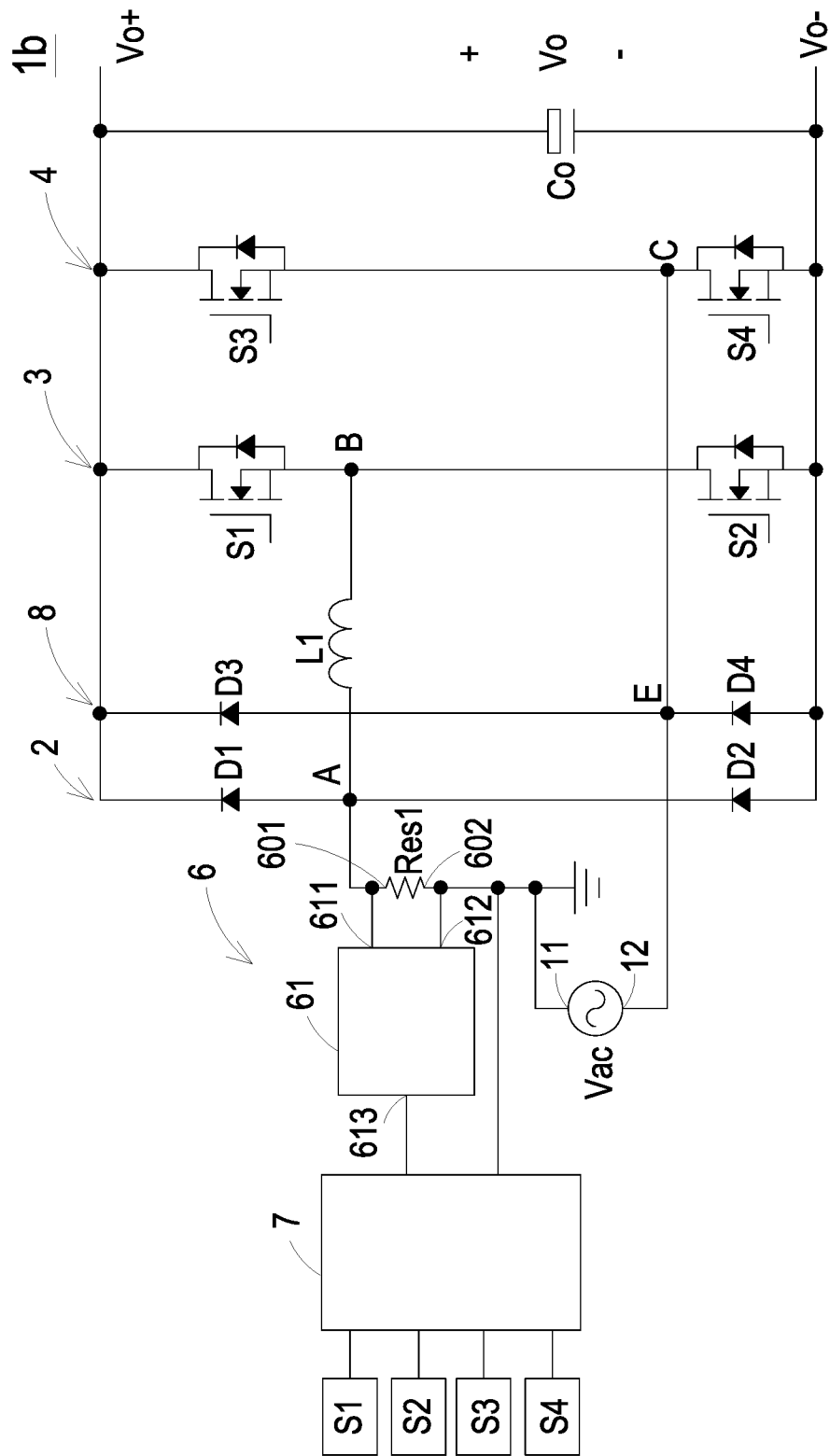
FIG. 6 is a schematic circuit diagram illustrating the circuitry topology of a totem pole power factor correction circuit according to a third embodiment of the present disclosure.

In the embodiment of FIG. 1, the totem pole power factor correction circuit 1 includes two bypass diodes. It is noted that the number of bypass diodes in the totem pole power factor correction circuit may be adjusted according to the practical requirements. FIG. 6 is a schematic circuit diagram illustrating the circuitry topology of a totem pole power factor correction circuit according to a third embodiment of the present disclosure. In comparison with the totem pole power factor correction circuit of FIG. 1, the totem pole power factor correction circuit 1*b* of this embodiment includes four bypass diodes. In addition to the first bypass diode D1 and the second bypass diode D2 of the first bridge arm 2, the totem pole power factor correction circuit 1*b* of this embodiment further includes a third bypass diode D3 and a fourth bypass D4.

The third bypass diode D3 and the fourth bypass diode D4 are connected in series between the output positive terminal Vo+ and the output negative terminal Vo−. The third bypass diode D3 and the fourth bypass diode D4 are collaboratively formed as a fifth bridge arm 8. The fifth bridge arm 8, the first bridge arm 2, the second bridge arm 3, the third bridge arm 4, the fourth bridge arm 5 are connected with each other in parallel. The connection point between the third bypass diode D3 and the fourth bypass diode D4 is a fifth node E. The fifth node E is electrically connected with the second terminal 12 of the input power source Vac. By the first bypass diode D1 and the second bypass diode D2 of the first bridge arm 2 and the third bypass diode D3 and the fourth bypass D4 of the fifth bridge arm 8, the output capacitor Co is pre-charged before the totem pole power factor correction circuit 1*b* is enabled, and a clamping operation is performed to avoid inductance saturation when an inrush voltage (e.g., a voltage generated by thunder) is superimposed on the input power source Vac.

It is noted that numerous modifications and alterations may be made while retaining the teachings of the disclosure. For example, in a variant example, the first detection circuit 61 in the totem pole power factor correction circuit 1*b* of this embodiment includes an amplifier M, a resistor R1, a second resistor R2, a third resistor R3 and a DC power source DC_bias. That is, the first detection circuit 61 of this variant example is similar to that of FIG. 2. In another variant example, the first detection circuit 61 in the totem pole power factor correction circuit 1*b* of this embodiment further includes a filtering resistor Rf, a filtering capacitor Cf, a Zener diode ZD, a first divider resistor R4, a second divider resistor R5, a first bypass diode Da and a second bypass diode Db. That is, the first detection circuit 61 of this variant example is similar to that of FIG. 5.

Figure 7:
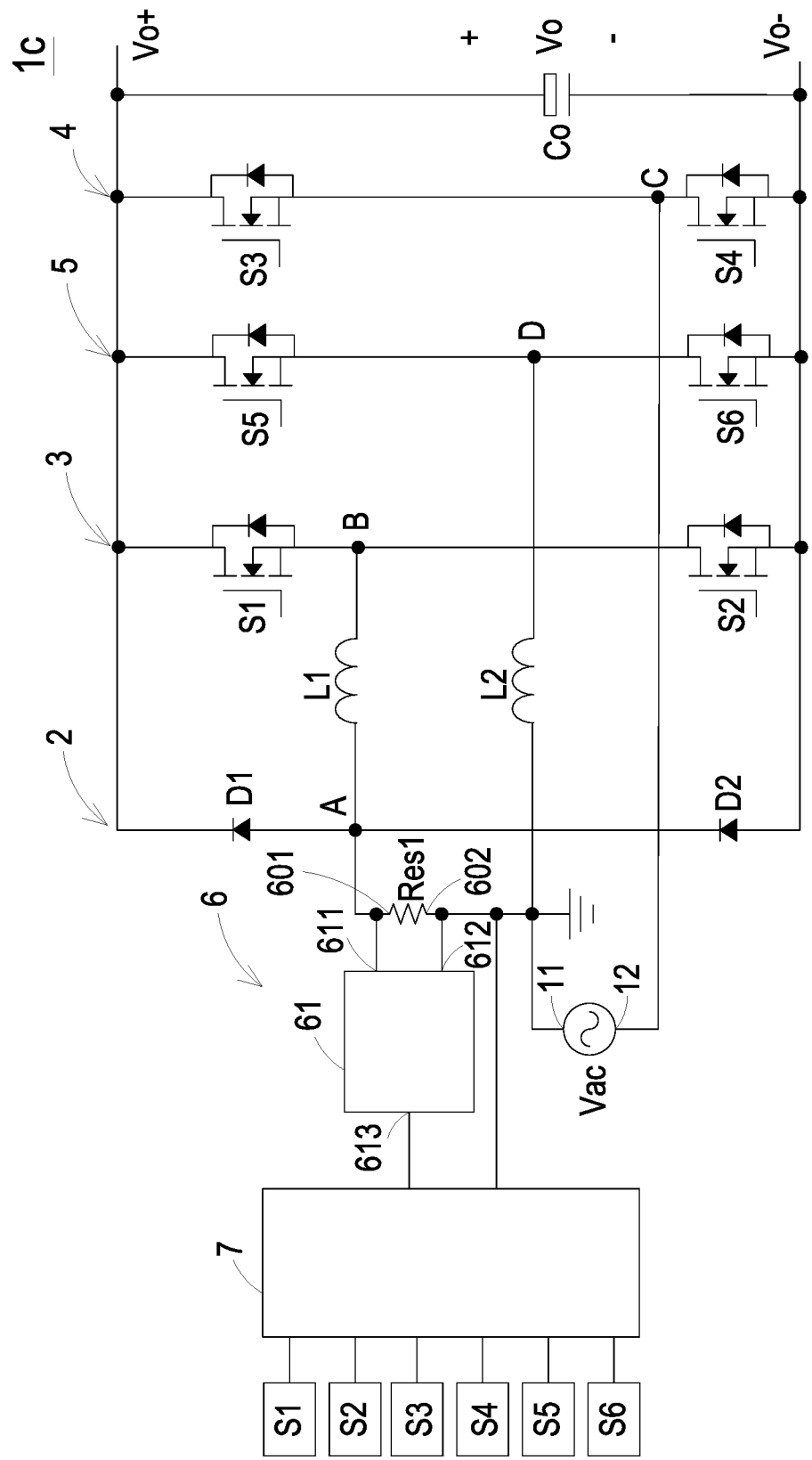
FIG. 7 is a schematic circuit diagram illustrating the circuitry topology of a totem pole power factor correction circuit according to a fourth embodiment of the present disclosure.

In the embodiment of FIG. 1, the totem pole power factor correction circuit 1 includes four switches. It is noted that the number of switches in the totem pole power factor correction circuit may be adjusted according to the practical requirements. FIG. 7 is a schematic circuit diagram illustrating the circuitry topology of a totem pole power factor correction circuit according to a fourth embodiment of the present disclosure. In comparison with the totem pole power factor correction circuit of FIG. 1, the totem pole power factor correction circuit 1*c* of this embodiment includes sixth switches. In addition to the first switch S1 and the second switch S2 of the second bridge arm 3 and the third switch S3 and the fourth switch S4 of the third bridge arm 4, the totem pole power factor correction circuit 1*c* of this embodiment further includes a fifth switch S5 and a sixth switch S6.

The fifth switch S5 and the sixth switch S6 are connected in series between the output positive terminal Vo+ and the output negative terminal Vo−. The fifth switch S5 and the sixth switch S6 are collaboratively formed as a fourth bridge arm 5. The fourth bridge arm 5, the first bridge arm 2, the second bridge arm 3 and the third bridge arm 4 are connected with each other in parallel. The connection point between the fifth switch S5 and the sixth switch S6 is a fourth node D. The fifth switch S5 and the sixth switch S6 are electrically connected with the control unit 7. For succinctness, the connecting relationship between the switches S5 and S6 and the control unit 7 is not shown. The on/off states of the fifth switch S5 and the sixth switch S6 are controlled by the control unit 7. The operations of the fifth switch S5 and the sixth switch S6 of the fourth bridge arm 5 are similar to the operations of the first switch S1 and the second switch S2 of the second bridge arm 3, and not redundantly described herein. In this embodiment, the fifth switch S5 and the sixth switch S6 are SiC switches, GaN switches or MOSFET switches.

The totem pole power factor correction circuit 1c of this embodiment further includes a second inductor L2. The second inductor L2 is electrically connected between the first terminal 11 of the input power source Vac and the fourth node D.

It is noted that numerous modifications and alterations may be made while retaining the teachings of the disclosure. For example, in a variant example, the first detection circuit 61 in the totem pole power factor correction circuit 1c of this embodiment includes an amplifier M, a resistor R1, a second resistor R2, a third resistor R3 and a DC power source DC_bias. That is, the first detection circuit 61 of this variant example is similar to that of FIG. 2. In another variant example, the first detection circuit 61 in the totem pole power factor correction circuit 1c of this embodiment further includes a filtering resistor Rf, a filtering capacitor Cf, a Zener diode ZD, a first divider resistor R4, a second divider resistor R5, a first bypass diode Da and a second bypass diode Db. That is, the first detection circuit 61 of this variant example is similar to that of FIG. 5.

Figure 8:
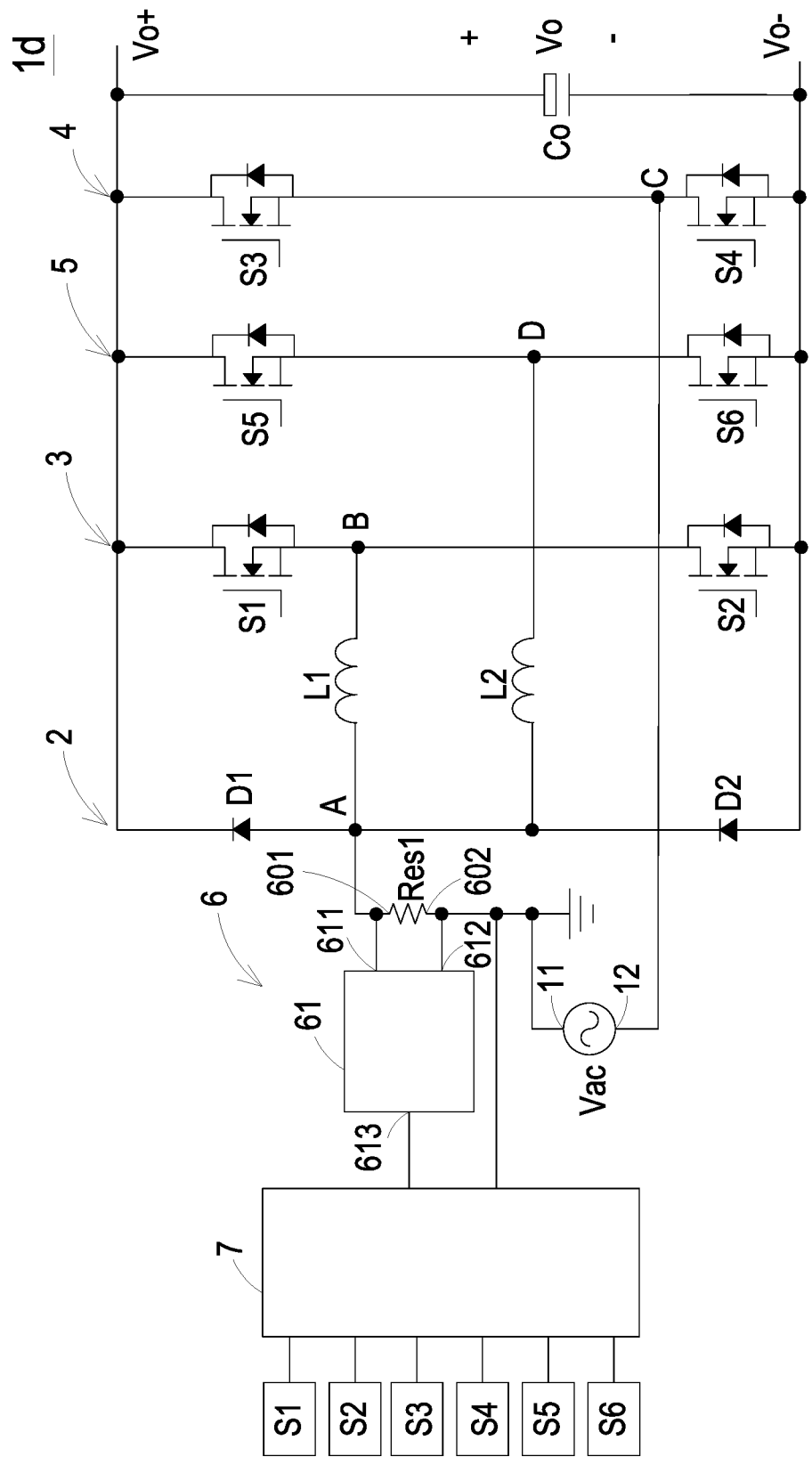
FIG. 8 is a schematic circuit diagram illustrating the circuitry topology of a totem pole power factor correction circuit according to a fifth embodiment of the present disclosure.

In FIG. 7, the second inductor L2 is electrically connected between the first terminal 11 of the input power source Vac and the fourth node D. It is noted that the installation position of the second inductor L2 is not restricted. FIG. 8 is a schematic circuit diagram illustrating the circuitry topology of a totem pole power factor correction circuit according to a fifth embodiment of the present disclosure. As shown in FIG. 8, the second inductor L2 in the totem pole power factor correction circuit 1d of this embodiment is electrically connected between the first node A and the fourth node D.

Figure 9:
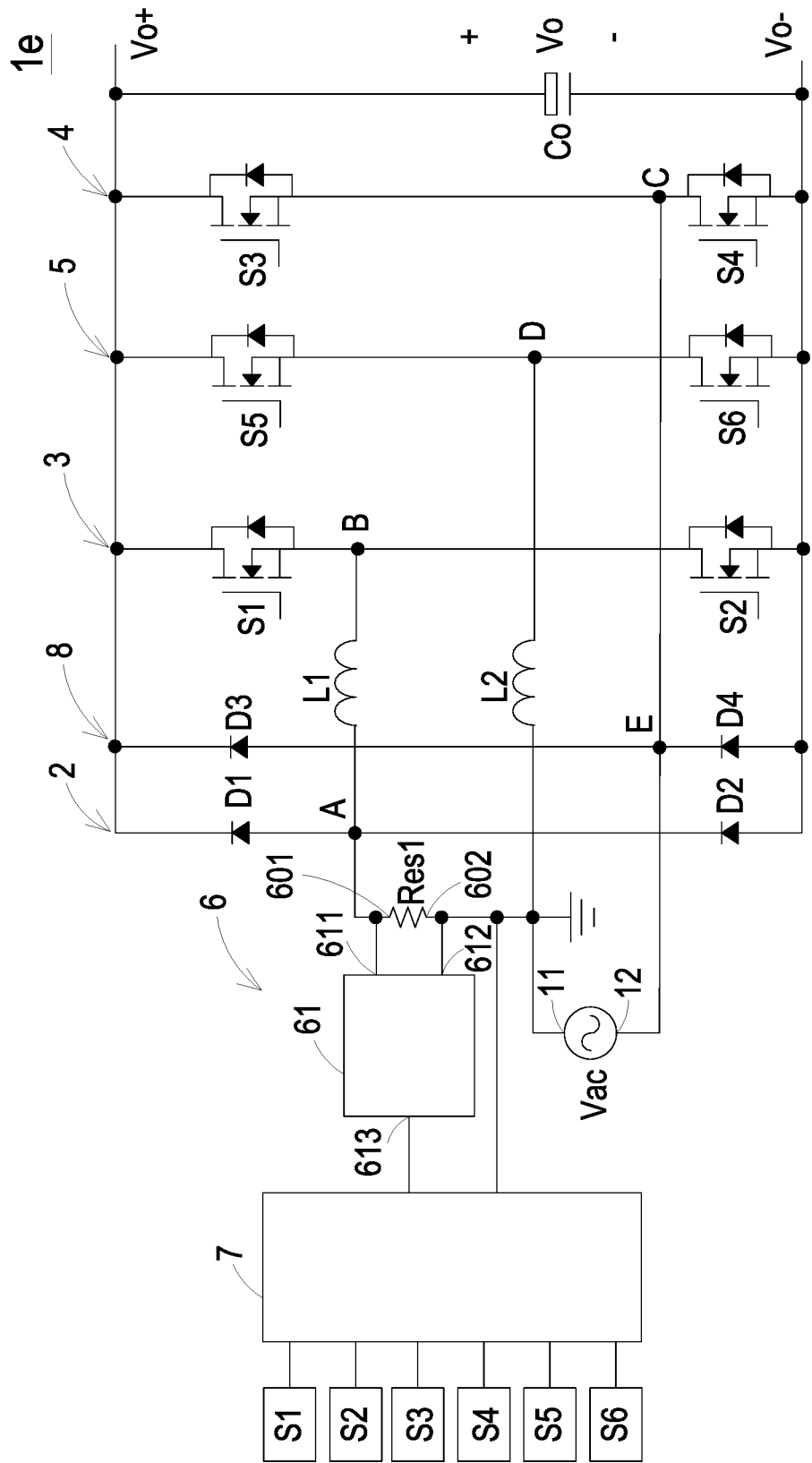
FIG. 9 is a schematic circuit diagram illustrating the circuitry topology of a totem pole power factor correction circuit according to a sixth embodiment of the present disclosure.

It is noted that the number of switches and the number of the bypass diodes in the totem pole power factor correction circuit may be adjusted according to the practical requirements. FIG. 9 is a schematic circuit diagram illustrating the circuitry topology of a totem pole power factor correction circuit according to a sixth embodiment of the present disclosure. In comparison with the totem pole power factor correction circuit 1b of FIG. 6, the totem pole power factor correction circuit 1e of this embodiment includes sixth switches. In addition to the first switch S1 and the second switch S2 of the second bridge arm 3 and the third switch S3 and the fourth switch S4 of the third bridge arm 4, the totem pole power factor correction circuit 1d of this embodiment further includes a fifth switch S5 and a sixth switch S6.

The fifth switch S5 and the sixth switch S6 are connected in series between the output positive terminal Vo+ and the output negative terminal Vo−. The fifth switch S5 and the sixth switch S6 are collaboratively formed as a fourth bridge arm 5. The fourth bridge arm 5, the first bridge arm 2, the second bridge arm 3, the third bridge arm 4 are connected with each other in parallel. The connection point between the fifth switch S5 and the sixth switch S6 is a fourth node D. The fifth switch S5 and the sixth switch S6 are electrically connected with the control unit 7. For succinctness, the connecting relationship between the switches S5 and S6 and the control unit 7 is not shown. The on/off states of the fifth switch S5 and the sixth switch S6 are controlled by the control unit 7. The operations of the fifth switch S5 and the sixth switch S6 of the fourth bridge arm 5 are similar to the operations of the first switch S1 and the second switch S2 of the second bridge arm 3, and not redundantly described herein. In this embodiment, the fifth switch S5 and the sixth switch S6 are SiC switches, GaN switches or MOSFET switches.

The totem pole power factor correction circuit 1e of this embodiment further includes a second inductor L2. The second inductor L2 is electrically connected between the first terminal 11 of the input power source Vac and the fourth node D.

It is noted that numerous modifications and alterations may be made while retaining the teachings of the disclosure. For example, in a variant example, the first detection circuit 61 in the totem pole power factor correction circuit 1e of this embodiment includes an amplifier M, a resistor R1, a second resistor R2, a third resistor R3 and a DC power source DC_bias. That is, the first detection circuit 61 of this variant example is similar to that of FIG. 2. In another variant example, the first detection circuit 61 in the totem pole power factor correction circuit 1e of this embodiment further includes a filtering resistor Rf, a filtering capacitor Cf, a Zener diode ZD, a first divider resistor R4, a second divider resistor R5, a first bypass diode Da and a second bypass diode Db. That is, the first detection circuit 61 of this variant example is similar to that of FIG. 5.

Figure 10:
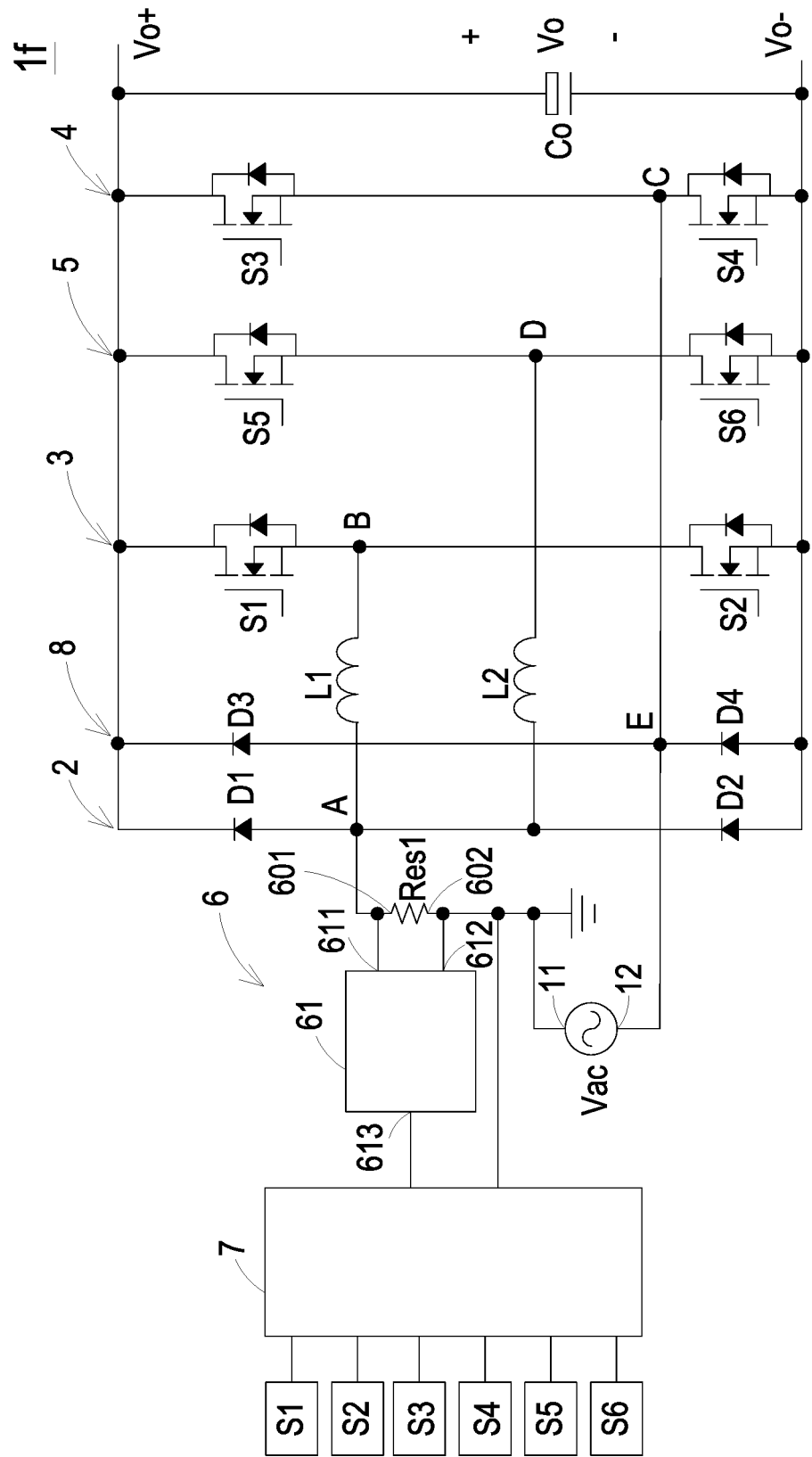
FIG. 10 is a schematic circuit diagram illustrating the circuitry topology of a totem pole power factor correction circuit according to a seventh embodiment of the present disclosure.

In FIG. 9, the second inductor L2 is electrically connected between the first terminal 11 of the input power source Vac and the fourth node D. It is noted that the installation position of the second inductor L2 is not restricted. FIG. 10 is a schematic circuit diagram illustrating the circuitry topology of a totem pole power factor correction circuit according to a seventh embodiment of the present disclosure. As shown in FIG. 10, the second inductor L2 in the totem pole power factor correction circuit if of this embodiment is electrically connected between the first node A and the fourth node D.

Figure 11:
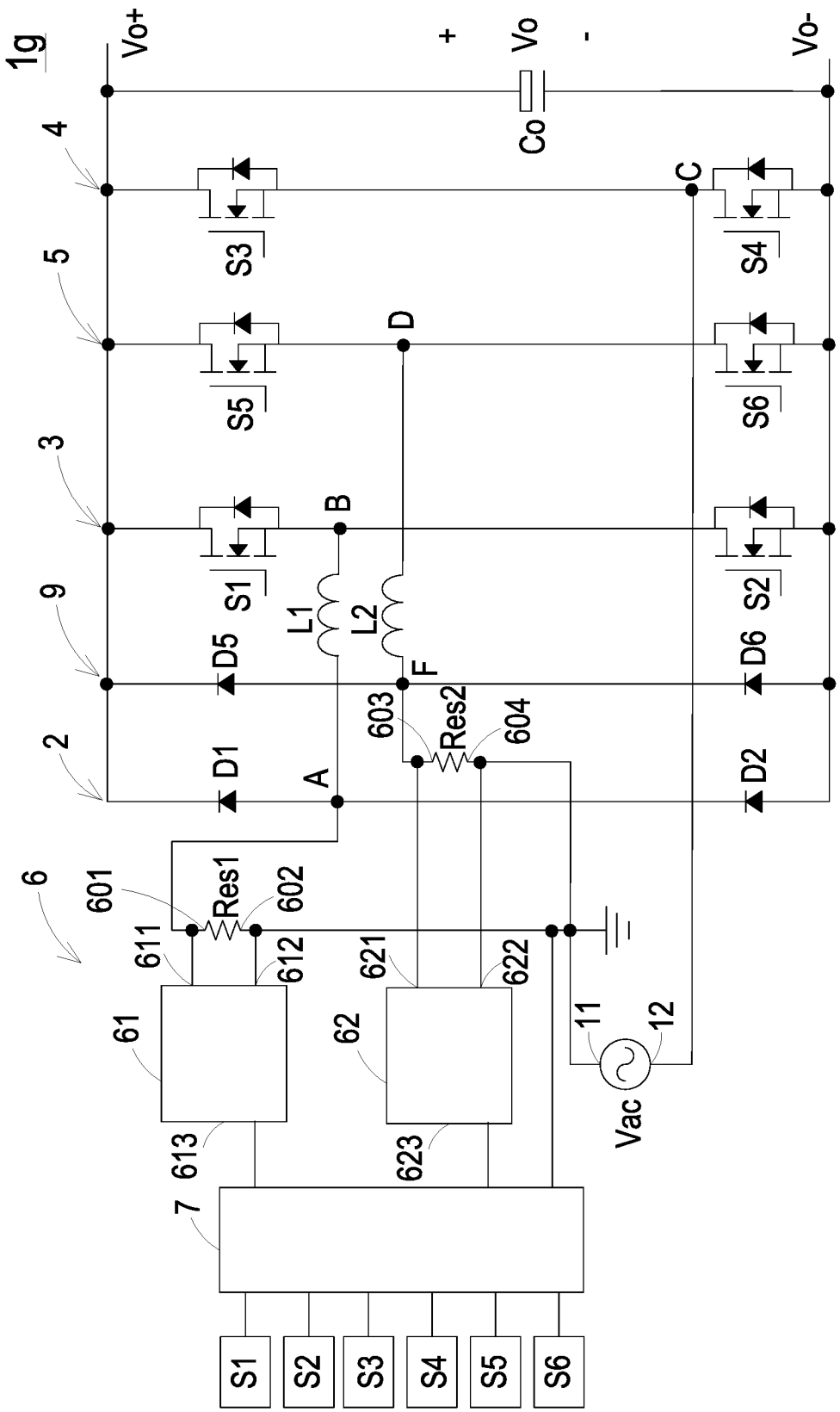
FIG. 11 is a schematic circuit diagram illustrating the circuitry topology of a totem pole power factor correction circuit according to an eighth embodiment of the present disclosure.

In order to confirm the operating state of the totem pole power factor correction circuit and control the on/off states of the corresponding switches when the second inductor L2 is in the charging mode or the discharging mode, the totem pole power factor correction circuit is further modified. For example, the detection module of the totem pole power factor correction circuit further includes a second detection resistor and a second detection circuit. FIG. 11 is a schematic circuit diagram illustrating the circuitry topology of a totem pole power factor correction circuit according to an eighth embodiment of the present disclosure. In comparison with the totem pole power factor correction circuit 1e of FIG. 9, the totem pole power factor correction circuit 1g of this embodiment is not equipped with the fifth bridge arm, but the totem pole power factor correction circuit 1e is additionally equipped with a sixth bridge arm 9.

The sixth bridge arm 9, the first bridge arm 2, the second bridge arm 3, the third bridge arm 4 and the fourth bridge arm 5 are connected with each other in parallel. The sixth bridge arm 9 includes a fifth bypass diode D5 and a sixth bypass diode D6. The fifth bypass diode D5 and the sixth bypass diode D6 are connected in series between the output positive terminal Vo+ and the output negative terminal Vo−. The connection point between the fifth bypass diode D5 and the sixth bypass diode D6 is a sixth node F.

The detection module 6 in the totem pole power factor correction circuit 1g of this embodiment further includes a second detection resistor Res2 and a second detection circuit 62. The second detection resistor Res2 includes a first terminal 603 and a second terminal 604. The first terminal 603 of the second detection resistor Res2 is electrically connected with the sixth node F. The second terminal 604 of the second detection resistor Res2 is electrically connected with the first terminal 11 of the input power source Vac. That is, the sixth node F between the fifth bypass diode D5 and the sixth bypass diode D6 is connected with the input terminal 11 of the input power source Vac through the second detection resistor Res2.

The second inductor L2 is electrically connected between the fourth node D and the sixth node F. Moreover, the second detection resistor Res2 and the second inductor L2 are connected in series between the fourth node D and the first terminal 11 of the input power source Vac. The current from the input power source Vac may flow through the second detection resistor Res2 and the second inductor L2. The second detection circuit 62 includes a first terminal 621, a second terminal 622 and a third terminal 623. The first terminal 621 of the second detection circuit 62, the first terminal 603 of the second detection resistor Res2 and the sixth node F are connected with each other. The second terminal 622 of the second detection circuit 62, the second terminal 604 of the second detection resistor Res2 and the first terminal 11 of the input power source Vac are connected with each other. The third terminal 623 of the second detection circuit 62 is electrically connected with the control unit 7.

When the current from the input power source Vac flows through the second detection resistor Res2 and the second inductor L2, the second detection circuit 62 generates an output voltage according to a voltage difference between the two terminals of the second detection resistor Res2. The output voltage is transmitted to the control unit 7 through the third terminal 623 of the second detection circuit 62. The control unit 7 is electrically connected with the third terminal 623 of the second detection circuit 62. According to the output voltage from the first detection circuit 61 and the output voltage from the second detection circuit 62, the corresponding switches (e.g., the first switch S1, the second switch S2, the third switch S3, the fourth switch S4, the fifth switch S5 and the sixth switch S6) are control under control of the control unit 7. The control unit 7 controls the on/off states of the corresponding switches according to the result of comparing the output voltage from the third terminal 613 of the first detection circuit 61 with the upper limit voltage threshold and the lower limit voltage threshold and the result of comparing the output voltage from the third terminal 623 of the second detection circuit 62 with the upper limit voltage threshold and the lower limit voltage threshold.

It is noted that numerous modifications and alterations may be made while retaining the teachings of the disclosure. For example, in a variant example, the first detection circuit 61 and/or the second detection circuit 62 in the totem pole power factor correction circuit 1g of this embodiment includes an amplifier M, a resistor R1, a second resistor R2, a third resistor R3 and a DC power source DC_bias. That is, the first detection circuit 61 and/or the second detection circuit 62 of this variant example is similar to the first detection circuit 61 of FIG. 2. In another variant example, the first detection circuit 61 and/or the second detection circuit 62 in the totem pole power factor correction circuit 1g of this embodiment further includes a filtering resistor Rf, a filtering capacitor Cf, a Zener diode ZD, a first divider resistor R4, a second divider resistor R5, a first bypass diode Da and a second bypass diode Db. That is, the first detection circuit 61 and/or the second detection circuit 62 of this variant example is similar to the first detection circuit 61 of FIG. 5.

Figure 12:
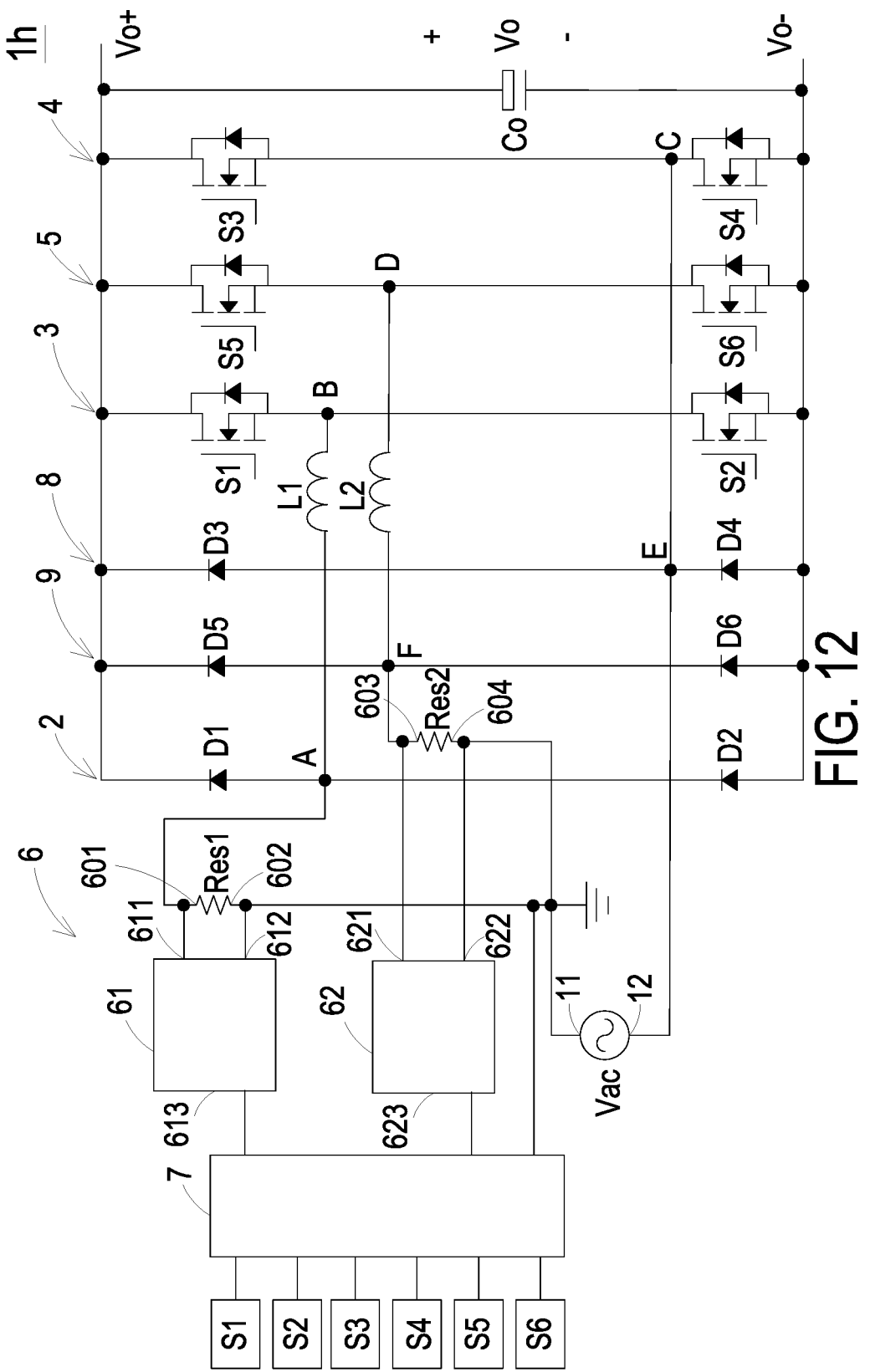
FIG. 12 is a schematic circuit diagram illustrating the circuitry topology of a totem pole power factor correction circuit according to a ninth embodiment of the present disclosure.

The number of the bypass diodes in the totem pole power factor correction circuit with two detection circuits may be increased according to the practical requirement. FIG. 12 is a schematic circuit diagram illustrating the circuitry topology of a totem pole power factor correction circuit according to a ninth embodiment of the present disclosure. The totem pole power factor correction circuit 1g as shown in FIG. 11 only includes four bypass diodes (i.e., the bypass diode D1 and the second bypass diode D2 of the first bridge arm 2 and the fifth bypass diode D5 and the sixth bypass diode D6 of the sixth bridge arm 9). In comparison with the totem pole power factor correction circuit 1g of FIG. 11, the totem pole power factor correction circuit 1h of this embodiment includes six bypass diodes. In addition to the first bypass diode D1 and the second bypass diode D2 of the first bridge arm 2 and the fifth bypass diode D5 and the sixth bypass D6 of the sixth bridge arm 9, the totem pole power factor correction circuit 1h of this embodiment further includes a third bypass diode D3 and a fourth bypass diode D4.

The third bypass diode D3 and the fourth bypass diode are connected in series between the output positive terminal Vo+ and the output negative terminal Vo−. The third bypass diode D3 and the fourth bypass diode are collaboratively formed as a fifth bridge arm 8. The fifth bridge arm 8, the first bridge arm 2, the second bridge arm 3, the third bridge arm 4, the fourth bridge arm 5 and the sixth bridge arm 9 are connected with each other in parallel. The connection point between the third bypass diode D3 and the fourth bypass diode D4 is the fifth node E. The fifth node E is electrically connected with the second terminal 12 of the input power source Vac.

It is noted that numerous modifications and alterations may be made while retaining the teachings of the disclosure. For example, in a variant example, the first detection circuit 61 and/or the second detection circuit 62 in the totem pole power factor correction circuit 1h of this embodiment includes an amplifier M, a resistor R1, a second resistor R2, a third resistor R3 and a DC power source DC_bias. That is, the first detection circuit 61 and/or the second detection circuit 62 of this variant example is similar to the first detection circuit 61 of FIG. 2. In another variant example, the first detection circuit 61 and/or the second detection circuit 62 in the totem pole power factor correction circuit 1h of this embodiment further includes a filtering resistor Rf, a filtering capacitor Cf, a Zener diode ZD, a first divider resistor R4, a second divider resistor R5, a first bypass diode Da and a second bypass diode Db. That is, the first detection circuit 61 and/or the second detection circuit 62 of this variant example is similar to the first detection circuit 61 of FIG. 5.

From the above descriptions, the present disclosure provides the totem pole power factor correction circuit. The first detection resistor and the first inductor are connected between the first terminal of the input power source and the second node. The control unit can determine whether the totem pole power factor correction circuit is in the normal working state or the abnormal state according to the output voltage from the third terminal of the first detection circuit. If the control unit determines that the totem pole power factor correction circuit is in the abnormal state, a protecting mechanism can be rapidly enabled according to the output voltage from the first detection circuit.

If the totem pole power factor correction circuit is in the normal working state, and the totem pole power factor correction circuit is in the steady state (for example, the output power and the input voltage remain unchanged) or the output power (or the input voltage) is changed (e.g., increased or decreased), the control unit controls the on/off states of the corresponding switches in the totem pole power factor correction circuit according to the output voltage from the third terminal of the first detection circuit. In other words, the control unit confirms the operating state of the totem pole power factor correction circuit and when the totem pole power factor correction circuit is in the normal working state, the on/off states of the corresponding switches in the totem pole power factor correction circuit are controlled by using the single first detection circuit. In comparison with the conventional totem pole power factor correction circuit using at least two detection modules, the number of detection module used in the totem pole power factor correction circuit of the present disclosure is reduced. Consequently, the totem pole power factor correction circuit of the present disclosure has reduced volume and reduced cost.

Furthermore, the detection module in the totem pole power factor correction circuit includes the first detection resistor and the first detection circuit. If the output voltage from the first detection circuit is greater than or equal to the upper limit voltage threshold or lower than or equal to the lower limit voltage threshold, at least the third switch and the fourth switch are turned off under control of the control unit. In other words, the control unit determines whether the totem pole power factor correction circuit is in the normal working state according to the result of comparing the output voltage with the upper limit voltage threshold and the lower limit voltage threshold. If the output voltage from the first detection circuit is greater than or equal to the upper limit voltage threshold or lower than or equal to the lower limit voltage threshold, the control unit determines that the totem pole power factor correction circuit is in the abnormal state (e.g., in a short-circuited condition). When the totem pole power factor correction circuit 1 is operated in the abnormal state, at least the third switch and the fourth switch are turned off under control of the control unit. Consequently, the totem pole power factor correction circuit can be protected.

In case that an inrush voltage (e.g., a voltage generated by thunder) is superimposed on the input AC power, the polarity of the power supply is suddenly reversed. The inconsistent control occurs because of time delay. Consequently, the input power source is possibly in the short-circuited condition, or due to the switch is erroneously triggered, the input power source is possibly in the short-circuited condition. Under these circumstances, if the output voltage is greater than or equal to the upper limit voltage threshold or lower than or equal to the lower limit voltage threshold, the corresponding switches are rapidly turned off under control of the control unit. So the protecting measure can be taken immediately. Consequently, the possibility of causing damage of the totem pole power factor correction circuit will be minimized.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A totem pole power factor correction circuit electrically coupled with an input power source, the totem pole power factor correction circuit comprising:
    a first bridge arm comprising a first bypass diode and a second bypass diode connected in series, wherein a connection point between the first bypass diode and the second bypass diode is a first node;
    a second bridge arm connected with the first bridge arm in parallel, wherein the second bridge arm comprises a first switch and a second switch connected in series, and a connection point between the first switch and the second switch is a second node;
    a third bridge arm connected with the first bridge arm in parallel, wherein the third bridge arm comprises a third switch and a fourth switch connected in series, and a connection point between the third switch and the fourth switch is a third node, wherein the third node is electrically connected with a second terminal of the input power source;
    a first inductor electrically connected between the first node and the second node;
    a detection module comprising a first detection resistor and a first detection circuit, wherein a first terminal of the first detection resistor, the first node and a first terminal of the first detection circuit are connected with each other, and a second terminal of the first detection resistor, a first terminal of the input power source and a second terminal of the first detection circuit are connected with each other, wherein a voltage difference between the first terminal and the second terminal of the first detection resistor is detected by the first detection circuit, and an output voltage is outputted from a third terminal of the first detection circuit; and
    a control unit electrically coupled with the third terminal of the first detection circuit, and controlling the first switch, the second switch, the third switch and the fourth switch, wherein when the output voltage is greater than or equal to an upper limit voltage threshold or the output voltage is smaller than or equal to a lower limit voltage threshold, at least the third switch and the fourth switch are turned off under control of the control unit.

2. The totem pole power factor correction circuit according to claim 1, wherein the first detection circuit comprises an amplifier, a first resistor, a second resistor, a third resistor and a DC power supply, wherein an output terminal of the amplifier is electrically coupled with the third terminal of the first detection circuit, the first resistor is electrically connected between a negative input terminal of the amplifier and the first terminal of the first detection circuit, the second resistor is electrically connected between a positive input terminal of the amplifier and the second terminal of the first detection circuit, the third resistor is electrically connected between the negative input terminal of the amplifier and the output terminal of the amplifier, a positive terminal of the DC power supply is electrically coupled with the positive input terminal of the amplifier, and a negative terminal of the DC power supply is electrically connected with the second terminal of the first detection circuit and a ground terminal.

3. The totem pole power factor correction circuit according to claim 2, wherein the first detection circuit further comprises a filtering resistor and a filtering capacitor, wherein the filtering resistor is electrically connected between the output terminal of the amplifier and the third terminal of the first detection circuit, and the filtering capacitor is electrically connected between the filtering resistor and the second terminal of the first detection circuit.

4. The totem pole power factor correction circuit according to claim 1, wherein the first detection circuit further comprises a Zener diode, wherein an anode of the Zener diode is electrically connected with the second terminal of the first detection circuit, and a cathode of the Zener diode is electrically connected with the third terminal of the first detection circuit.

5. The totem pole power factor correction circuit according to claim 2, wherein the first detection circuit further comprises a first divider resistor and a second divider resistor, wherein the first divider resistor is electrically connected between the positive input terminal of the amplifier and the positive terminal of the DC power supply, and the second divider resistor is electrically connected between the positive input terminal of the amplifier and the second terminal of the first detection circuit.

6. The totem pole power factor correction circuit according to claim 1, wherein the first detection circuit further comprises a first clamping diode and a second clamping diode, wherein an anode of the first clamping diode is connected with the first terminal of the first detection circuit, a cathode of the first clamping diode is connected with the second terminal of the first detection circuit, an anode of the second clamping diode is connected with the second terminal of the first detection circuit, and a cathode of the second clamping diode is connected with the first terminal of the first detection circuit.

7. The totem pole power factor correction circuit according to claim 1, wherein the totem pole power factor correction circuit further comprises a fourth bridge arm and a second inductor, wherein the fourth bridge arm is connected with the first bridge arm in parallel, and the fourth bridge arm comprises a fifth switch and a sixth switch connected in series, wherein a connection point between the fifth switch and the sixth switch is a fourth node, and the second inductor is electrically connected between the first node and the fourth node.

8. The totem pole power factor correction circuit according to claim 1, wherein the totem pole power factor correction circuit further comprises a fourth bridge arm and a second inductor, wherein the fourth bridge arm is connected with the first bridge arm in parallel, and the fourth bridge arm comprises a fifth switch and a sixth switch connected in series, wherein a connection point between the fifth switch and the sixth switch is a fourth node, and the second inductor is electrically connected between the first terminal of the input power source and the fourth node.

9. The totem pole power factor correction circuit according to claim 1, wherein the totem pole power factor correction circuit further comprises a fifth bridge arm, and the fifth bridge arm comprises a third bypass diode and a fourth bypass diode connected in series, wherein a connection point between the third bypass diode and the fourth bypass diode is a fifth node, and the fifth node is connected with the second terminal of the input power source.

10. The totem pole power factor correction circuit according to claim 9, wherein the totem pole power factor correction circuit further comprises a fourth bridge arm and a second inductor, wherein the fourth bridge arm is connected with the first bridge arm in parallel, and the fourth bridge arm comprises a fifth switch and a sixth switch connected in series, wherein a connection point between the fifth switch and the sixth switch is a fourth node, and the second inductor is electrically connected between the first node and the fourth node.

11. The totem pole power factor correction circuit according to claim 9, wherein the totem pole power factor correction circuit further comprises a fourth bridge arm and a second inductor, wherein the fourth bridge arm is connected with the first bridge arm in parallel, and the fourth bridge arm comprises a fifth switch and a sixth switch connected in series, wherein a connection point between the fifth switch and the sixth switch is a fourth node, and the second inductor is electrically connected between the first terminal of the input power source and the fourth node.

12. The totem pole power factor correction circuit according to claim 1, wherein the totem pole power factor correction circuit further comprises a fourth bridge arm, a sixth bridge arm and a second inductor, and the detection module further comprises a second detection resistor and a second detection circuit, wherein the fourth bridge arm is connected with the first bridge arm in parallel, the fourth bridge arm comprises a fifth switch and a sixth switch, connected in series and a connection point between the fifth switch and the sixth switch is a fourth node, wherein the sixth bridge arm comprises a fifth bypass diode and a sixth bypass diode connected in series, a connection point between the fifth bypass diode and the sixth bypass diode is a sixth node, and the second inductor is connected between the sixth node and the fourth node, wherein a first terminal of the second detection resistor, the sixth node and a first terminal of the second detection circuit are connected with each other, and a second terminal of the second detection resistor, the first terminal of the input power source and a second terminal of the second detection circuit are connected with each other.

13. The totem pole power factor correction circuit according to claim 12, wherein the totem pole power factor correction circuit further comprises a fifth bridge arm, and the fifth bridge arm comprises a third bypass diode and a fourth bypass diode connected in series, wherein a connection point between the third bypass diode and the fourth bypass diode is a fifth node, and the fifth node is electrically connected with the second terminal of the input power source.

14. The totem pole power factor correction circuit according to claim 1, wherein when the output voltage from the first detection circuit is lower than the upper limit voltage threshold and greater than the lower limit voltage threshold, an input AC power of the input power source is in a positive half-cycle and the first inductor is in a charging mode, the second switch and the fourth switch are turned on and the first switch and the third switch are turned off under control of the control unit according to the output voltage from the first detection circuit.

15. The totem pole power factor correction circuit according to claim 14, wherein when an input voltage of the totem pole power factor correction circuit is decreased or an output power of the totem pole power factor correction circuit is increased, an on duration of the second switch is extended under control of the control unit according to the output voltage from the first detection circuit, wherein when the input voltage of the totem pole power factor correction circuit is increased or the output power of the totem pole power factor correction circuit is decreased, the on duration of the second switch is shortened under control of the control unit according to the output voltage from the first detection circuit.

16. The totem pole power factor correction circuit according to claim 1, wherein when the output voltage from the first detection circuit is lower than the upper limit voltage threshold and greater than the lower limit voltage threshold, an input AC power of the input power source is in a positive half-cycle and the first inductor is in a discharging mode, the first switch and the fourth switch are turned on and the second switch and the third switch are turned off under control of the control unit according to the output voltage from the first detection circuit.

17. The totem pole power factor correction circuit according to claim 1, wherein when the output voltage from the first detection circuit is lower than the upper limit voltage threshold and greater than the lower limit voltage threshold, an input AC power of the input power source is in a negative half-cycle and the first inductor is in a charging mode, the first switch and the third switch are turned on and the second switch and the fourth switch are turned off under control of the control unit according to the output voltage from the first detection circuit.

18. The totem pole power factor correction circuit according to claim 17, wherein when an input voltage of the totem pole power factor correction circuit is decreased or an output power of the totem pole power factor correction circuit is increased, an on duration of the first switch is extended under control of the control unit according to the output voltage from the first detection circuit, wherein when the input voltage of the totem pole power factor correction circuit is increased or the output power of the totem pole power factor correction circuit is decreased, the on duration of the first switch is shortened under control of the control unit according to the output voltage from the first detection circuit.

19. The totem pole power factor correction circuit according to claim 1, wherein when the output voltage from the first detection circuit is lower than the upper limit voltage threshold and greater than the lower limit voltage threshold, an input AC power of the input power source is in a negative half-cycle and the first inductor is in a discharging mode, the second switch and the third switch are turned on and the first switch and the fourth switch are turned off under control of the control unit according to the output voltage from the first detection circuit.

\* \* \* \* \*